US006774072B2

(12) United States Patent
Zou et al.

(10) Patent No.: US 6,774,072 B2
(45) Date of Patent: Aug. 10, 2004

(54) CRYSTALLIZED GLASS FOR INFORMATION RECORDING MEDIUM, CRYSTALLIZED GLASS SUBSTRATE, AND INFORMATION RECORDING MEDIUM USING THE CRYSTALLIZED GLASS SUBSTRATE

(75) Inventors: Xuelu Zou, Akishima (JP); Kouji Azegami, Tachikawa (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/372,109

(22) Filed: Feb. 25, 2003

(65) Prior Publication Data

US 2003/0171201 A1 Sep. 11, 2003

Related U.S. Application Data

(62) Division of application No. 09/912,562, filed on Jul. 26, 2001, now Pat. No. 6,569,792, which is a division of application No. 09/266,753, filed on Mar. 12, 1999, now Pat. No. 6,294,490.

(30) Foreign Application Priority Data

| Mar. 13, 1998 | (JP) | 10-63623 |
| Mar. 13, 1998 | (JP) | 10-63634 |
| Mar. 13, 1998 | (JP) | 10-63653 |
| Apr. 2, 1998 | (JP) | 10-90270 |
| Dec. 3, 1998 | (JP) | 10-343964 |
| Dec. 3, 1998 | (JP) | 10-343983 |

(51) Int. Cl.[7] .................. C03C 10/04; C03C 10/08; C03C 10/14
(52) U.S. Cl. .............. 501/4; 501/5; 501/9; 428/694 ST
(58) Field of Search ............. 501/4, 5, 9; 428/694 ST, 428/694 SG

(56) References Cited

U.S. PATENT DOCUMENTS

| 3,490,888 A | 1/1970 | Strong |
| 5,476,821 A | 12/1995 | Beall et al. |
| 5,491,116 A | 2/1996 | Beall et al. |
| 5,532,194 A | 7/1996 | Kawashima et al. |
| 5,895,767 A | 4/1999 | Yamaguchi et al. |
| 5,981,015 A | 11/1999 | Zou et al. |
| 5,997,977 A | 12/1999 | Zou et al. |
| 6,063,470 A | 5/2000 | Zou et al. |
| 6,124,223 A | 9/2000 | Beall et al. |
| 6,245,411 B1 | 6/2001 | Goto et al. |

FOREIGN PATENT DOCUMENTS

| DE | 28 12 859 | 10/1979 |
| EP | 0 289 943 A1 | 11/1988 |

(List continued on next page.)

OTHER PUBLICATIONS

Provisional Application 60/031662, Nov. 21, 1996.*

Primary Examiner—Karl Group
(74) Attorney, Agent, or Firm—Burns, Doane, Swecker & Mathis, L.L.P.

(57) ABSTRACT

Enclosed are crystallized glasses suitable for a substrate for an information recording medium such as a magnetic disc, optical disc, or optomagnetic disc, a substrate for information recording medium using such a crystallized glass substrate, and an information recording medium using such a substrate for information recording medium. The crystallized glasses are capable of providing a glass substrate having a high Young's modulus, as well as excellent mechanical strength, surface flatness, and heat resistance and having an excellent surface smoothness upon polishing. Glass substrate having an excellent surface smoothness using such a crystallized glass are also disclosed.

9 Claims, 8 Drawing Sheets

Photograph of atomic force microscope of Example 1-16

Image Statistics

| Img. Z range | 4.019 nM |
| Img. Rms (Rq) | 0.509 nM |
| Img. Ra | 0.397 nM |
| Img. Rmax | 4.019 nM |

Box Statistics

Z range
Rms (Rq)
Mean roughness (Ra)
Max height (Rmax)

FOREIGN PATENT DOCUMENTS

| | | |
|---|---|---|
| EP | 0 858 974 A1 | 8/1998 |
| EP | 0 939 395 A1 | 9/1999 |
| GB | 940403 | 9/1961 |
| JP | 59137341 | 8/1984 |
| JP | 1-239036 A | 9/1989 |
| JP | 04021543 | 1/1992 |
| JP | 05186243 | 7/1993 |
| JP | 2516553 | 11/1994 |
| JP | 07053238 | 2/1995 |
| JP | 07247138 | 9/1995 |
| JP | 07291660 A | 11/1995 |
| WO | WO 98/22405 | 5/1998 |

* cited by examiner

Photograph of atomic force microscope of Example 2 - 5

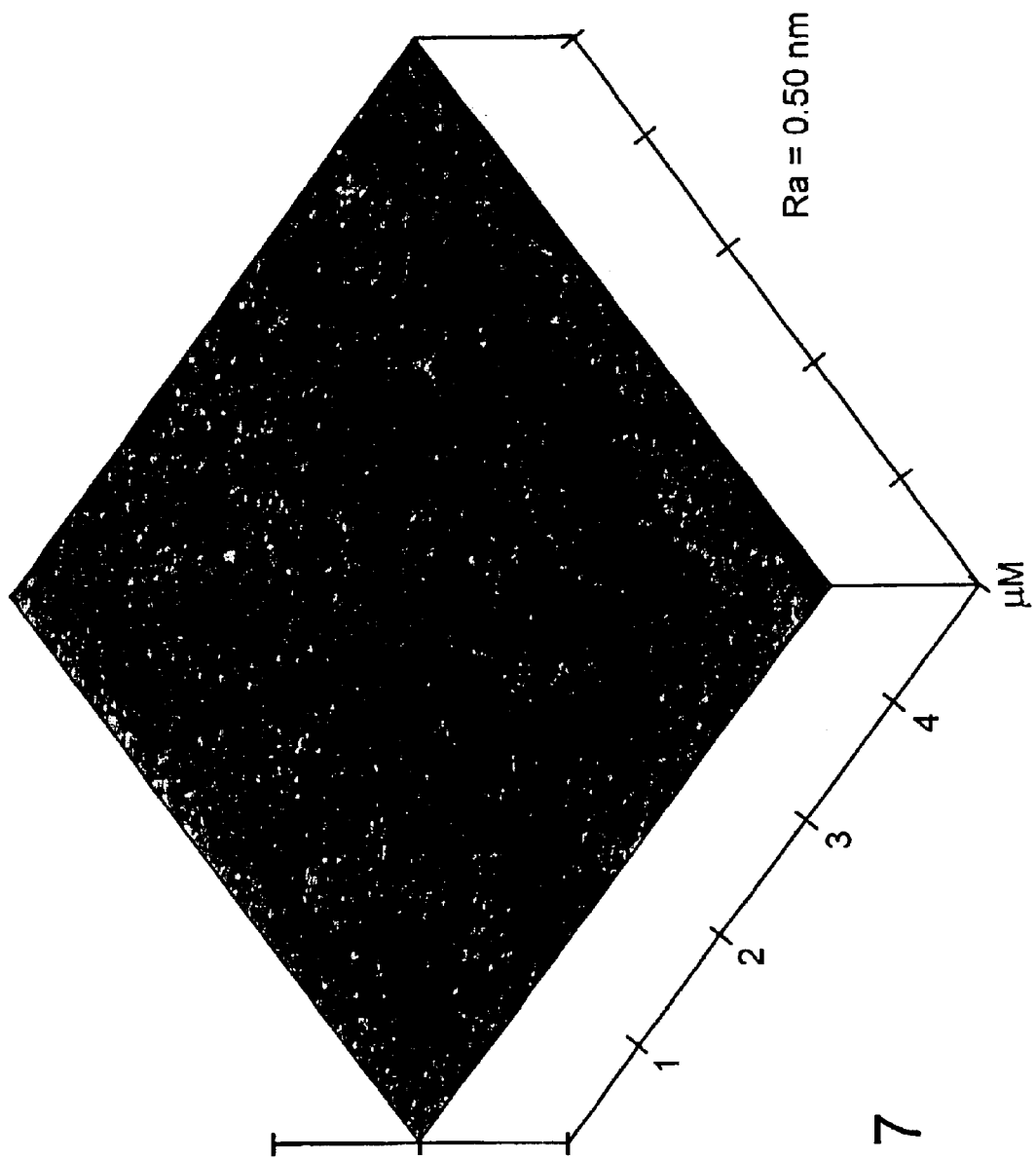
FIG. 7 Photograph of atomic force microscope of Example 4 - 4

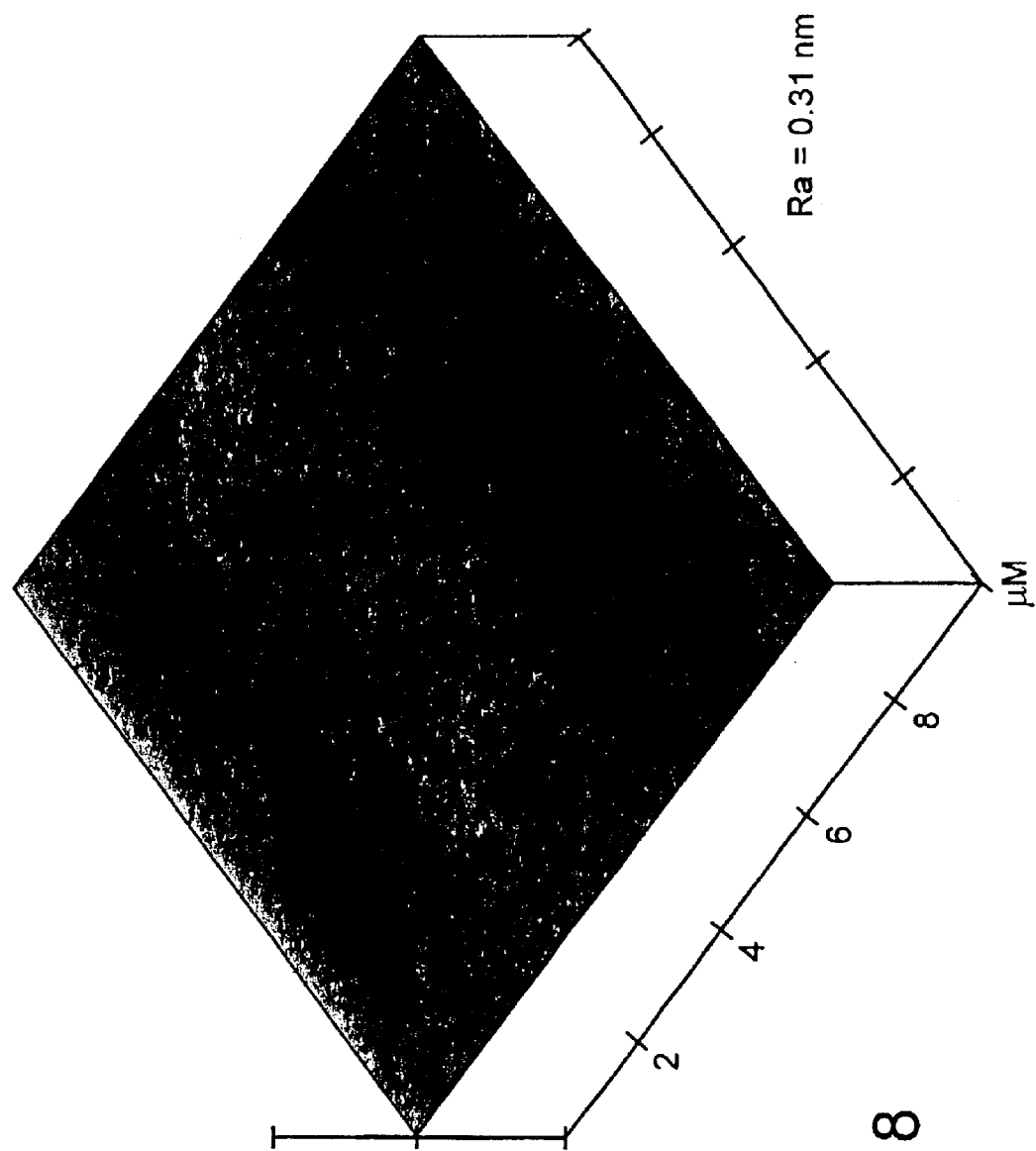
FIG. 8 Photograph of atomic force microscope of Example 5 - 4

CRYSTALLIZED GLASS FOR INFORMATION RECORDING MEDIUM, CRYSTALLIZED GLASS SUBSTRATE, AND INFORMATION RECORDING MEDIUM USING THE CRYSTALLIZED GLASS SUBSTRATE

This application is a divisional of Application Ser. No. 09/912,562, filed on Jul. 26, 2001, now U.S. Pat. No. 6,569,792 which is a divisional of Application Ser. No. 09/266,753, filed on Mar. 12, 1999, now U.S. Pat. No. 6,294,490.

BACKGROUND OF THE INVENTION

1. Field of the Invention

This invention relates to a crystallized glass suitable for a substrate for an information recording medium such as a magnetic disc, optical disc, or optomagnetic disc, a substrate for information recording medium using such a crystallized glass substrate, and an information recording medium using such a substrate for information recording medium. More particularly, this invention relates to a crystallized glass capable of providing a glass substrate having a high Young's modulus, as well as excellent mechanical strength, surface flatness, and heat resistance and having an excellent surface smoothness upon polishing and to a glass substrate having an excellent surface smoothness using such a crystallized glass.

2. Description of Related Art

Major components of a magnetic recording apparatus in, e.g., a computer, includes a magnetic recording medium and a magnetic head for magnetic recording and reproducing. As a magnetic recording medium, known are a flexible disc and a hard disc. Aluminum alloy, among materials, has been used for the substrate material for hard disc. The floating amount of the magnetic head is significantly reduced in accordance with recent trends that hard disc drives for note type personal computer are made smaller and that the magnetic recording is made with higher density. A very high precision, according to those trends, is required for surface smoothness on the magnetic disc substrate. In the case of an aluminum alloy, however, it is difficult to manufacture a flat surface with a precision of a certain degree or higher, because the polished surface may be plastically deformed due to a low hardness even if a polishing material having a high precision and a machine tool are used for polishing. Even if nickel-phosphorus plating is made on a surface of the aluminum alloy, the surface roughness Ra cannot be controlled at five angstroms or less. According to the developments of the hard disc drives that become smaller and thinner, there are strong demands for making thinner the magnetic disc substrate. The aluminum alloy, however, has low strength and rigidity, and therefore, it is difficult to make the disc thin while the hard disc drive maintains certain strength as required from the specification for the drive.

To solve such problems, a glass substrate for magnetic disc claiming high strength, high rigidity, high impact resistance, and high surface smoothness has been developed. Chemically reinforced glass substrates whose substrate surface is reinforced with an ion exchange method and crystallized substrates subjecting to a crystallization process, inter alia, are known well.

As a glass substrate reinforced by ion exchange, e.g., a glass disclosed in Japanese Unexamined Patent Publication No. 1-239,036 has been known. This ion exchange reinforced glass substrate is made of a glass including, by percent by weight, $SiO_2$ of 50–65%, $Al_2O_3$ of 0.5 to 14%, $R_2O$ (wherein R denotes alkali metal ion) of 10 to 32%, ZnO of 1 to 15%, and $Ba_2O_3$ of 1.1 to 14% where the glass is reinforced by forming compression stress layers on a surface of the glass substrate by an ion exchange method with alkali ions, and the above publication discloses such a glass substrate for magnetic disc.

As a crystallized glass, e.g., there is a disclosure in Japanese Patent Publication No. 2,516,553. This crystallized glass includes, by weight, $SiO_2$ of 65 to 83%, $Li_2O$ of 8 to 13%, $K_2O$ of 0 to 7%, MgO of 0.5 to 5.5%, ZnO of 0 to 5%, PbO of 0 to 5% (provided that MgO+ZnO+PbO is of 0.5 to 5% by weight), $P_2O_5$ of 1 to 4%, $Al_2O_3$ of 0 to 7%, and $As_2O_3+Sb_sO_3$ of 0 to 2% and is a glass for magnetic disc including fine crystal particles of $LiO_2.2SiO_2$ as a primary crystal.

A crystallized glass is disclosed also in Japanese Unexamined Patent Publication No. 7-291,660. The crystallized glass is obtained by melting a glass composed of, by percent by weight, $SiO_2$ of 38 to 50%, $Al_2O_3$ of 13 to 30%, MgO of 10 to 20% provided that, by weight ratio, $Al_2O_3$/MgO is 1.2 to 2.3, $B_2O_3$ of 0 to 5%, CaO of 0 to 5%, BaO of 0 to 5%, SrO of 0 to 5%, ZnO of 0.5 to 7.5%, $TiO_2$ of 4 to 15%, $ZrO_2$ of 0 to 5%, and $As_sO_3$ and/or $Sb_2O_3$ of 0 to 2% and thermally treating it after molding, and is a cordierite based crystallized glass having a feature that the glass contains as a primary crystal a cordierite based crystal. The above publication also discloses a substrate for magnetic disc made of a crystallized glass.

Another crystallized glass is also disclosed in Japanese Unexamined Patent Publication No. 9-77,531. This crystallized glass is a glass ceramic product having a Young's modules in a range from about $14 \times 10^6$ to about $24 \times 10^6$ psi (96 to 165 Gpa) and a breakdown tenacity more than 1.0 Mpa·m½. The crystallized glass is constituted of a crystal phase conglomerate mainly made of a spinel type crystal uniformly sized and evenly dispersed in the residual glass matrix phase including rich silicon. The glass is substantially made of, by percent by weight, $SiO_2$ of 35 to 60%, $Al_2O_3$ of 20 to 35%, MgO of 0 to 25%, ZnO of 0 to 25%, $TiO_2$ of 0 to 20%, $ZrO_2$ of 0 to 10%, $Li_2O$ of 0 to 2%, NiO of 0 to 8%, wherein the total of MgO and ZnO is at least 10%, and may contain an arbitrary component selected up to 5% from a group constituted of BaO, CaO, PbO, SrO, $P_2O_5$, $B_2O_3$ and $Ga_2O_3$, and $R_2O$ of 0 to 5% selected from a group constituted of $Na_2O$, $K_2O$, $Rb_sO$, and $Cs_sO$, and a transitional metal oxide of 0 to 8%. The glass may be a glass ceramic having a composition in which the total amount of $TiO_2$+$ZrO_2$+NiO is of 5% or more in the case where $Al_2O_3$ is contained only in an amount of about 25% or less, and the above publication also discloses a substrate for magnetic disc made of a glass ceramic.

However, in accordance with recent trends that the hard discs are made smaller and thinner and that the recording is made with a higher density, flying height of the magnetic head is lower, and the disc is rotated at a higher speed, so that strength, Young's modulus, and surface smoothness of the disc substrate material are further severely needed. Particularly, the surface smoothness and surface flatness of the substrate material are strictly on demands due to trends for higher density information recording on 3.5 inch hard discs for personal computers and servers, and the disc has to be rotated at 10,000 rpm or more in corresponding to higher speed of data processing. While the rigidity of the substrate material is subject to a further strict standard, it is apparent that the conventional aluminum substrate is already limiting itself. As far as demands for disc drives having a higher capacity and higher speed are necessary from now on, a substrate material for magnetic recording medium is required doubtlessly to have high Young's modulus, high strength, excellent surface flatness, good impact resistance, and so on.

The necessity for high Young's modulus can be illustrated based on the following facts. That is, according to recent trends for HDDs (hard disc drives) which are made smaller with high capacity and high operation speed, future substrates for magnetic recording medium may have the thickness of 0.635 mm, currently 0.8 mm in the case of 3.5 inches and of 0.43 mm or 0.38 mm, currently 0.635 mm in the case of 2.5 inches, and the rotation speed of the substrate may predictably be made higher to 140,000 rpm from current 100,000 rpm as the maximum speed. Such a substrate for magnetic recording medium may tend to sustain more looseness and undulation and warp as the substrate for magnetic recording medium becomes thinner, and the stress (force exerted to the disc based on an air pressure created from rotation) that the substrate receives predictably becomes larger as the substrate spins with a higher speed. Based on a dynamics theory, flexion W of a disc which receives load P per unit area is denoted as follows:

$$W \propto \frac{Pa^4}{h^3 E}$$

wherein: a represents the outer diameter of the disc; h represents the thickness of the substrate; E represents the Young's modulus of the disc material. Only gravity is exerted to the disc at a still state. The warp is indicated as, where the specific gravity of the disc material is represented by d, $$W \propto \frac{hda^4}{h^3 E} = \frac{da^4}{h^2 E} = \frac{a^4}{h^2 G}$$

Herein, G represents the specific modulus of elasticity (=Young's modulus/specific gravity) of the disc material. Meanwhile, in the case that the gravity component can be neglected upon balancing centrifugal components in a rotational state of the disc, the force exerted to the disc can be deemed as air pressure based on the rotation. Such an air pressure is a function relating to the rotation speed of the disc, and it can be said generally as proportional to square of the speed. Accordingly, where the disc spins at a high speed the warp W can be represented as follows:

$$w \propto \frac{(rpm)^2 a^4}{h^3 E}$$

According to this consequence, it turns out that a substrate material having a high Young's modulus is required to suppress the vibration in the substrate that is subject to high speed spinning. From a calculation done by the inventors, the specific modulus of elasticity of the substrate material is required to be at least 37 MNm/kg or higher if the substrate thickness is reduced to 0.43 mm from 0.635 mm in the case of 2.5 inch substrates and to 0.635 mm from 0.8 mm in the case of 3.5 inch substrates. If the rotation speed of the 3.5 inch high end substrate is made faster from current 7,200 rpm to future 10,000 rpm, the aluminum substrate having a Young's modulus of around 70 Gpa cannot correspond to it, and a new substrate material having a Young's modulus of at least 110 Gpa or higher is required. Because the substrate has not only a higher rigidity but also a higher impact resistance and strength as the substrate material has higher specific modulus of elasticity and higher Young's modulus, the market of the hard disc drive strongly seeks a glass material having a higher modulus of elasticity and a higher Young's modulus.

The chemically reinforced glass as disclosed above in Japanese Unexamined Patent Publication No. 1-239,036, however, has a Young's modulus of about 80 Gpa, and it is apparent that such a glass cannot response to strict demands on upcoming hard discs. The conventional glass for ion exchange reinforced substrate has alkali ions in a large amount introduced into the glass for ion exchange, and therefore, the reinforced glass has a low Young's modulus (90Gpa) as well as a low rigidity, so that the glass cannot correspond to substrates for 3.5 inch high end disc or thinner disc. A large amount of alkali component can be contained in a glass subjecting to a chemical reinforcement by the ion exchange. Therefore, if the glass is used for a long time under a high temperature and moisture environment, alkali ions may be deposited from pin holes in the magnetic film, thin portions of the magnetic film such as vicinities of the magnetic film, or exposed portions of the glass and may disadvantageously induce corrosions and deterioration of the magnetic film. During the manufacturing process for the magnetic recording medium, a prescribed thermal process can be used for improving characteristics such as coercive force of a magnetic layer after the magnetic layer is formed on the glass substrate. With such a conventional ion exchange reinforced glass, however, the glass transition temperature is at most around 500° C., and since the glass lacks heat resistance, there also raises a problem that the glass cannot obtain a high coercive force.

The conventional crystallized glass as disclosed above in Japanese Patent Publication No. 2,516,553 has a little better property than the above chemically reinforced glass substrate in terms of the Young's modulus and the heat resistance. However, it has the surface roughness of 10 angstroms or higher, poor surface smoothness, and a limitation against lower flying of the magnetic head. Therefore, there raises a problem that the glass may not correspond to high density trends of the magnetic recording. Furthermore, the Young's modulus is at most about 90 to 100 Gpa, so that such a glass cannot be used for substrates for 3.5 inch high end disc or thinner disc.

The crystallized glass disclosed in Japanese Unexamined Patent Publication No. 7-291,660 has a Young's modulus of at most 100 to 130 Gpa, which is inadequate for use. Moreover, the glass has a limited surface smoothness in which the mean roughness of central line (Ra) is about only eight angstroms and lacks smoothness. In addition, the glass has a high liquid phase temperature of about 1400° C., and therefore, the glass has a disadvantage that the glass is hardly subject to a high temperature melting and high temperature molding.

SUMMARY OF THE INVENTION

It is an object of the invention to provide a crystallized glass suitable for a substrate for information recording medium such as a magnetic disc having high Young's modulus, strength, and heat resistance as well as excellent surface smoothness and surface uniformity, which can be produced in an inexpensive way with a relatively low liquid phase temperature, in consideration of future demands on such a substrate for magnetic recording medium with thinner size, high strength, high heat resistance, high impact resistance, and so on.

It is another object of the invention to provide a substrate for information recording medium such as a magnetic disc or the like and an information recording medium such as a magnetic disc using this substrate, made of the above crystallized glass in having high Young's modulus, strength, and heat resistance as well as excellent surface smoothness and surface uniformity, which can be produced in an inexpensive way with a relatively low liquid phase temperature.

The foregoing objects are accomplished by providing a crystallized glass substrate for information recording medium having a composition including $SiO_2$ of 35 to 65 mol %, $Al_2O_3$ of 5 to 25 mol %, MgO of 10 to 40 mol %, $TiO_2$ of 5 to 15 mol %, and $Y_2O_3$ of 0.8 to 10 mol %. The inventors have discovered that where a $SiO_2$—$Al_2O_3$—MgO based glass with a $TiO_2$ component as a nucleus forming agent contains $Y_2O_3$ as a necessary element, a good crystallized glass is obtainable which is suitable for substrate for information recording medium having a high Young's modulus of 120 Gpa or higher and a good surface smoothness. The inventors completed the above crystallized glass.

In another aspect of the invention, a crystallized glass substrate for information recording medium has a composition including $SiO_2$ of 35 to 65 mol %, $Al_2O_3$ of 5 to 25 mol %, MgO of 10 to 40 mol %, and $TiO_2$ of 5 to 15 mol %, in which a mole ratio ($Al_2O_3$/MgO) is less than 0.5. The inventors have discovered that where a $SiO_2$—$Al_2O_3$—MgO based glass with a $TiO_2$ component as a nucleus forming agent is controlled to have a mole ratio ($Al_2O_3$/MgO) less than 0.5, a good crystallized glass is obtainable which is suitable for substrate for information recording medium having a high Young's modulus of 140 Gpa or higher and a good surface smoothness, as well as a relatively low liquid phase temperature. The inventors then completed the above crystallized glass.

In yet another aspect of the invention, a crystallized glass substrate for information recording medium has a composition including $SiO_2$ of 35 to 65 mol %, $Al_2O_3$ of 5 to 25 mol %, MgO of 10 to 40 mol %, $TiO_2$ of 5 to 15 mol %, and $Li_2O$ of 0.2 to 10 mol %, wherein the substrate has a primary crystal phase made of a quasi-stable quartz solid solution and an enstatite, and wherein the mean grain size of the crystal grains is 1 micron or less. The inventors also have discovered that where a $SiO_2$—$Al_2O_3$—MgO based original glass with $TiO_2$ component as a nucleus forming agent contains $Li_2O$ as a necessary element, and where the primary crystal phase is made of a quasi-stable quartz solid solution having one or more components selected from $2MgO.2Al_2O_3.5SiO_2$, $MgO.Al_2O_3.3SiO_2$, $MgO.Al_2O_3.4SiO_2$ or a mixture composition made of $2MgO.2Al_2O_3.5SiO_2$, $MgO.Al_2O_3.3SiO_2$, and $MgO.Al_2O_3.4SiO_2$ and an enstatite having a composition of $MgO.SiO_2$ and $(Mg.Al)SiO_3$, the crystallized glass is formed with a very high Young's modulus of 130 Gpa or higher in having a very smooth surface upon fining the mean grain size of the crystal grain at 1 micron or smaller. The inventors thereby completed the above crystallized glass.

In a further aspect of the invention, a crystallized glass for information recording disc has a composition including $SiO_2$ of 42 to 65 mol %, $Al_2O_3$ of 0 to 15 mol %, MgO of 5 to 30 mol %, $Y_2O_3$ of 0.5 to 8 mol %, and $Li_2O$ greater than 10 mol % but equal to or less than 25 mol %, wherein the glass has a primary crystal phase made of a quasi-stable quartz solid solution and an enstatite.

Moreover, in a still another aspect of the invention, a crystallized glass for information recording disc has a composition including $SiO_2$ of 35 to 55 mol %, $Al_2O_3$ equal to or more than 0 mol % and less than 5 mol %, MgO of 25 to 45 mol %, $Y_2O_3$ of 0.5 to 8 mol %, $ZrO_2$ of 0 to 10 mol %, and $TiO_2$ of 0 to 12 mol %, providing that $ZrO_2+TiO_2$ is of 4.5 mol % to 18 mol %, wherein the glass has a primary crystal phase made of a quasi-stable quartz solid solution and/or an enstatite. The inventors discovered that where an original glass in which a MgO—$SiO_2$ based glass contains $Y_2O_3$, $TiO_2$, $ZrO_2$, and $Al_2O_3$ as necessary components is thermally treated in a proper temperature range, the crystallized glass on which fine crystal grains or particles made of quartz solid solution, enstatite, and the like are deposited has a high Young's modulus of 140 to 200 Gpa, as well as excellent mechanical strength, surface smoothness, surface flatness, and heat resistance, and can be molded easily. The crystallized glass substrate thus obtained can be polished easily and has an excellent chemical property as a magnetic disc substrate. The inventors thereby completed the above crystallized glass.

This invention also concerns information recording medium having a recording layer formed on a substrate for information recording medium made of the crystallized glass thus produced.

BRIEF DESCRIPTION OF THE DRAWINGS

The above and other objects and features of the invention are apparent to those skilled in the art from the following preferred embodiments thereof when considered in conjunction with the accompanied drawings, in which:

FIG. 7 is a photograph, in lieu of a drawing, of an atomic force microscope showing a state of a thermally treated crystallized glass obtained in Example 4-4 after polished at a polishing step for the optical glass; and FIG. 8 is a photograph, in lieu of a drawing, of an atomic force microscope showing a state of a thermally treated crystallized glass obtained in Example 5-4 after polished at a polishing step for the optical glass.

DETAILED DESCRIPTION OF THE PREFERRED EMBODIMENTS

Figure 1:
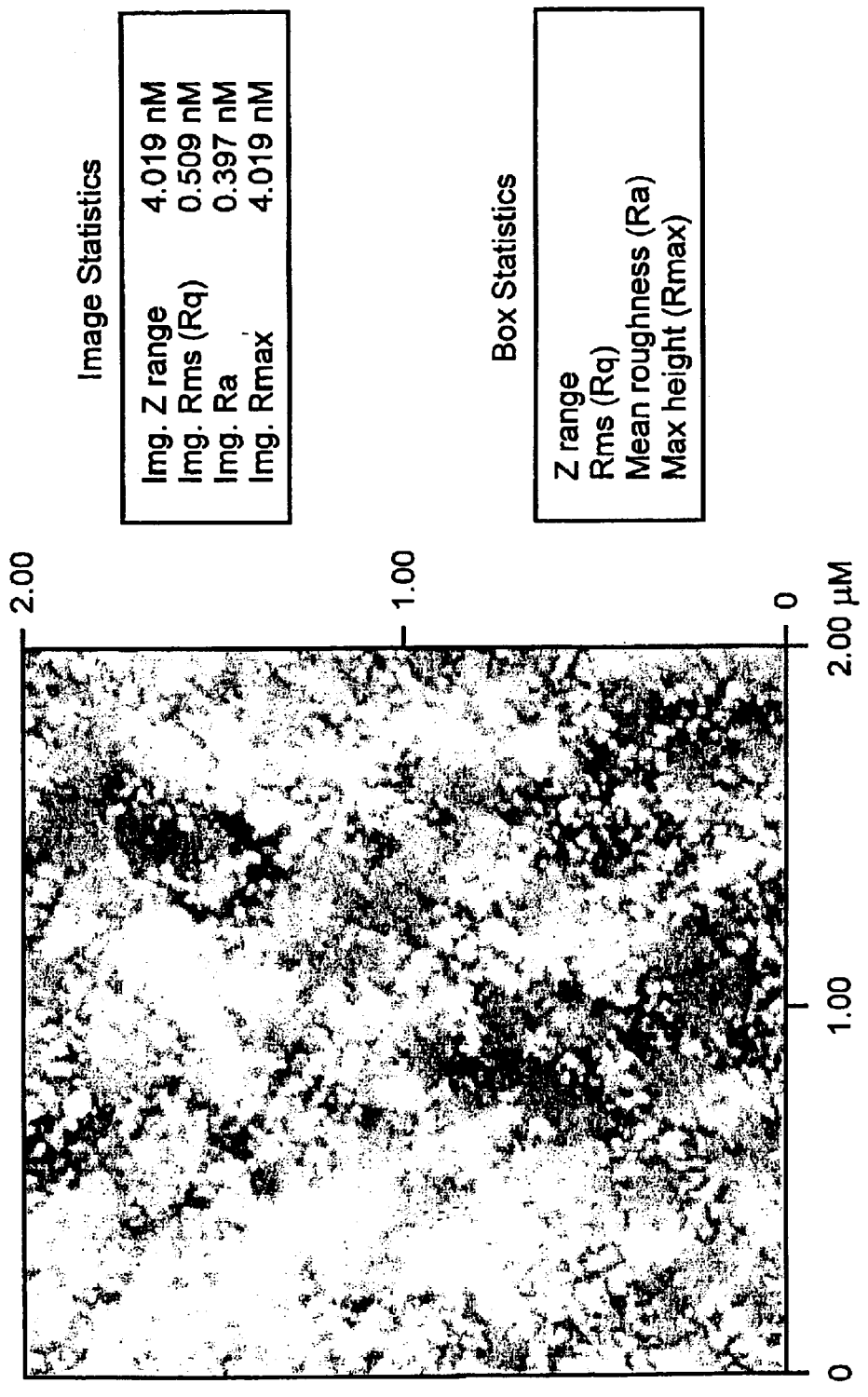
FIG. 1 is a photograph of an atomic force microscope showing a crystallized glass obtained in Example 1-16.

In this description, a symbol "%" means "mol % or mole percentage" unless specifically indicated.

First Embodiment [Crystallized Glass]

Each component constituting a glass for a crystallized glass (First Embodiment) constituting a substrate for information recording medium is described below.

$SiO_2$ is a glass material having a meshed structure and also serves as a structural component for, as major deposited crystals, a quasi-stable quartz solid solution such as $2MgO.2Al_2O_3.5SiO_2$, $MgO.Al_2O_3.3SiO_2$, and $MgO.Al_2O_3.4SiO_2$ and an enstatite having a component of $MgO.SiO_2$ and enstatite solid solution with components of $(Mg.Al)SiO_3$. Where $SiO_2$ is contained in an amount less than 35%, the melting glass becomes so unstable, thereby making molding at a high temperature hard and crystal depositions difficult. Furthermore, where $SiO_2$ is contained in an amount less than 35%, the residual glass matrix phase may suffer from impaired chemical resistance, and the glass tends to suffer from a worse heat resistance. On the other hand, where $SiO_2$ is contained in an amount more than 65%, the quasi-stable quartz solid solution and the enstatite as the primary crystal phase tend to be not readily deposited, and the Young's modulus of the glass tends to rapidly become small. Therefore, a proper contained amount of $SiO_2$ is in a range of 35 to 65% in consideration of deposited crystal species, deposited amounts, chemical resistance, heat resistance, molding property, and productivity. From a viewpoint to obtain a crystallized glass having more preferable property, the contained amount of $SiO_2$ is preferably in a range of 37 to 60%.

$Al_2O_3$ is an intermediate oxide of a glass and is a structural component of, as major crystal species, a quasi-stable quartz solid solution such as $2MgO.2Al_2O_3.5SiO_2$, $MgO.Al_2O_3.3SiO_2$, and $MgO.Al_2O_3.4SiO_2$. $Al_2O_3$ promotes deposition of the quasi-stable quartz solid solution and contributes to improvements of surface hardness of the glass. However, if the contained amount of $Al_2O_3$ is less than 5%, the high Young's modulus crystal as described above may not be deposited well, and the glass matrix phase may suffer from impaired chemical resistance while the substrate material may lose the required strength. On the other hand, when the contained amount of $Al_2O_3$ exceeds 25 mol %, the high Young's modulus crystal phase such as an enstatite may be not readily deposited, and the glass may not be melted easily due to a high melting temperature while losing its transparency and easiness for molding. Therefore, in consideration of solubility of the glass, molding property at high temperature, deposited crystal species, and so on, the contained amount of $Al_2O_3$ is in a range of 5 to 25% and preferably in a range of 7 to 22%.

MgO is a modification component of the glass, has a crystal structure of the enstatite or quasi-stable quartz solid solution and also serves as a main component of the crystal species having a composition such as $2MgO.2Al_2O_3.5SiO_2$, $MgO.Al_2O_3.3SiO_2$, or $MgO.Al_2O_3.4SiO_2$. Where the contained amount of MgO is less than 10% the crystal as described above may not be deposited well, and the glass tends to lose the transparency and may be subject to a higher melting temperature, while a temperature span suitable for glass molding operation tends to be narrowed. On the other hand, if the contained amount of MgO exceeds 40%, the high temperature viscosity of the glass suddenly falls to render the glass thermally unstable, thereby impairing productivity, as well as lowering the Young's modulus and the durability. Therefore, in consideration of productivity, chemical resistance, high temperature viscosity, strength, and so on of the glass, the contained amount of MgO is in a range of 10 to 40% and preferably in a range of 12 to 38%.

$TiO_2$ is a nucleus forming agent for crystal phase deposition of the enstatite crystal phase and the crystal phase of $2MgO.2Al_2O_3.5SiO_2$, $MgO.Al_2O_3.3SiO_2$, and $MgO.Al_2O_3.4SiO_2$ having a crystal structure of a quasi-stable quartz solid solution. $TiO_2$ also has an effect to suppress loss of glass transparency where the contained amount of $SiO_2$ is less. It is to be noted that where the contained amount of $TiO_2$ is less than 5%, a uniform crystallized glass may not be produced easily due to surface crystallization on the glass where $TiO_2$ does not serve adequately as the nucleus forming agent for primary crystal. On the other hand, where the contained amount of $TiO_2$ exceeds 15%, the glass may suffer from divided phases due to too lowered high temperature viscosity or from loss of transparency, thereby making the productivity of the glass extremely impaired. Consequently, in consideration of productivity, chemical resistance, high temperature viscosity, crystal nucleus production, and so on of the glass, the contained amount of $TiO_2$ is in a range of 5 to 15% and preferably in a range of 5.5 to 14%.

For the crystallized glass according to the invention, $Y_2O_3$ works importantly. As described in embodiments below, introduction of $Y_2O_3$ of 2%, for example, increases the Young's modulus of the crystallized glass by about 10 Gpa, so that the liquid temperature can be reduced by about 50 to 100° C. That is, introduction of $Y_2O_3$ in a small amount significantly improves characteristics and productivity of glass. However, if the contained amount of $Y_2O_3$ is less than 0.8%, such effects of $Y_2O_3$ are not obtainable adequately. The $Y_2O_3$ has power to suppress the growth of the primary crystal contained in the glass. Therefore, if the contained amount of $Y_2O_3$ is too much, a surface crystallization occurs during a thermal treatment for crystallizing the glass, so that the aimed glass may not be produced. From this viewpoint, a proper contained amount of $Y_2O_3$ is equal to and less than 10%. Particularly, the contained amount of $Y_2O_3$ is preferably equal to or less than 8%.

As components other than the above, one or more oxides of alkali metals and alkali earth metals, such as $Li_2O$, $Na_2O$, $K_2O$, CaO, SrO, BaO, ZnO, NiO of 0 to 10 mol % and $B_2O_3$, $P_2O_5$, $R_2O_3$ (R is rare earth metal ions except Y), $ZrO_2$, $CeO_2$, $N_2O_5$ (N is Nb or Ta) of 0 to 5 mol % can be contained as far as the above oxides do not impair the characteristics belonging to the crystallized glass.

As an anti-bubbling agent, $As_2O_3$ and/or $Sb_2O_3$ can be contained for making the glass uniform. In accordance with the high temperature viscosity varied in association with the glass composition, addition of either or both of $As_2O_3$ and $Sb_2O_3$ to the glass in an appropriate amount creates a glass with further uniformity. If the addition amount of the anti-bubbling agent is too much, the specific gravity of the glass may increase to lower the Young's modulus, and a platinum crucible may inflict damages due to agent's reaction with the crucible for melting. It is therefore proper that the adding amount of the anti-bubbling agent is equal to or less than 2%, and preferably equal to or less than 1.5%.

Impurities in a raw material other than the above fundamental components, e.g., Cl, F, $SO_3$, and the like, which serve as a glass clarifier may be contained as far as the impurities are in an amount less than 1%, which do not impair the characteristics belonging to the crystallized glass.

The primary crystal phase of the crystallized glass according to the invention can be, e.g., an enstatite crystal phase having a composition of $MgO.SiO_2$ and enstatite solid solution with components of $(Mg.Al)SiO_3$ and a quasi-stable quartz solid solution having one or more compositions selected from a group of $2MgO.2Al_2O_3.5SiO_2$, $MgO.Al_2O_3.3SiO_2$, and $MgO.Al_2O_3.4SiO_2$, or particulary, β-quartz solid solution. It is to be noted that the enstatite crystal phase includes clinoenstatite, protoenstatite, and one or more kinds of enstatites. With the crystallized glass of the invention, crystals other than the above such as spinel, mullite, $2MgO.SiO_2$, $MgO.SiO_2$, can be contained. The mean crystal size contained in the invented crystallized glass is preferably 3 microns or less, more preferably 1 micron or less, and further preferably 0.5 micron or less. If the mean of the crystal size exceeds 1 micron, it not only reduces the mechanical strength of the glass but also impairs surface roughness of the glass upon induction of defects of the crystal during polishing.

Second Embodiment [Crystallized Glass]

Each component constituting a glass for the invented crystallized glass (Second Embodiment) is described below.

$SiO_2$ is a glass material having a meshed structure and also serves as a structural component for, as major deposited crystals, a quasi-stable quartz solid solution such as $2MgO.2Al_2O_3.5SiO_2$, $MgO.Al_2O_3.3SiO_2$, and $MgO.Al_2O_3.4SiO_2$ and an enstatite having a component of $MgO.SiO_2$ and enstatite solid solution with components of $(Mg.Al)SiO_3$. Where $SiO_2$ is contained in an amount less than 35%, the melting glass becomes so unstable, thereby making molding at a high temperature hard and crystal depositions difficult. Furthermore, where $SiO_2$ is contained in an amount less than 35%, the residual glass matrix phase may suffer from impaired chemical resistance, and the glass tends to suffer from a worse heat resistance. On the other hand, where $SiO_2$ is contained in an amount more than 65%, the quasi-stable quartz solid solution and the enstatite as the primary crystal phase tend to be not readily deposited, and the Young's modulus of the glass tends to rapidly become small. Therefore, a proper contained amount of $SiO_2$ is in a range of 35 to 65% in consideration of deposited crystal species, deposited amounts, chemical resistance, heat resistance, molding property, and productivity. From a viewpoint to obtain a crystallized glass having more preferable property, the contained amount of $SiO_2$ is preferably in a range of 40 to 60%.

$Al_2O_3$ is an intermediate oxide of a glass and is a structural component of, as major crystal species, a quasi-stable quartz solid solution such as $2MgO.2Al_2O_3.5SiO_2$, $MgO.Al_2O_3.3SiO_2$, and $MgO.Al_2O_3.4SiO_2$. Introduction of $Al_2O_3$ promotes deposition of the quasi-stable quartz solid solution and contributes to improvements of surface hardness of the glass. However, if the contained amount of $Al_2O_3$ is less than 5%, the high Young's modulus crystal as described above may not be deposited well, and the glass matrix phase may suffer from impaired chemical resistance while the substrate material may lose the required strength. On the other hand, when the contained amount of $Al_2O_3$ exceeds 25 mol %, an enstatite as a primary crystal phase may be not readily deposited, and the glass may not be melted easily due to a high melting temperature while losing its transparency and easiness for molding. Therefore, in consideration of solubility of the glass, molding property at high temperature, deposited crystal species, and so on, the contained amount of $Al_2O_3$ is in a range of 5 to 25% and preferably in a range of 7 to 22%.

MgO is a modification component of the glass, has a crystal structure of the enstatite having a composition of $MgO.SiO_2$ and enstatite solid solution with components of $(Mg.Al)SiO_3$ or a quasi-stable quartz solid solution, and also serves as a main component of the crystal species having a composition such as $2MgO.2Al_2O_3.5SiO_2$, $MgO.Al_2O_3.3SiO_2$, or $MgO.Al_2O_3.4SiO_2$. Where the contained amount of MgO is less than 10%, the crystal as described above may not be deposited well, and the glass tends to lose the transparency and may be subject to a higher melting temperature, while a temperature span suitable for glass molding operation tends to be narrowed. On the other hand, if the contained amount of MgO exceeds 40% the high temperature viscosity of the glass suddenly falls to render the glass thermally unstable, thereby impairing productivity, as well as lowering the Young's modulus and the durability. Therefore, in consideration of productivity, chemical resistance, high temperature viscosity, strength, and so on of the glass, the contained amount of MgO is in a range of 10 to 40% and preferably in a range of 12 to 38%.

It is to be noted that the contained amounts of MgO and $Al_2O_3$ are adjusted so that the mole ratio ($Al_2O_3$/MgO) is less than 0.5. If the mole ratio ($Al_2O_3$/MgO) is equal to or more than 0.5, the Young's modulus of the crystallized glass tends to drop suddenly. Where the ratio $Al_2O_3$/MgO is set less than 0.5, a crystallized glass having a high Young's modulus of 150 GPa or higher can be obtained. It is preferable to set the ratio $Al_2O_3$/MgO less than 0.45. However, if the mole ratio of $Al_2O_3$/MgO is too small, the high temperature viscosity of the glass may be made lower, and therefore, the ratio is properly 0.2 or higher, and more preferably 0.25 or higher.

$TiO_2$ is a nucleus forming agent for crystal phase deposition of the enstatite crystal having a composition of $MgO.SiO_2$ and enstatite solid solution with components of $(Mg.Al)SiO_3$ and the crystal phase of $2MgO.2Al_2O_3.5SiO_2$, $MgO.Al_2O_3.3SiO_2$, and $MgO.Al_2O_3.4SiO_2$ having a crystal structure of a quasi-stable quartz solid solution. $TiO_2$ also has an effect to suppress loss of glass transparency where the contained amount of $SiO_2$ is less. It is to be noted that where the contained amount of $TiO_2$ is less than 5%, a uniform crystallized glass may not be produced easily due to surface crystallization on the glass where $TiO_2$ does not serve adequately as the nucleus forming agent for primary crystal. On the other hand, where the contained amount of $TiO_2$ exceeds 15%, the glass may suffer from divided phases due to too lowered high temperature viscosity or from loss of transparency, thereby making the productivity of the glass extremely impaired. Consequently, in consideration of productivity, chemical resistance, high temperature viscosity, crystal nucleus production, and so on of the glass, the contained amount of $TiO_2$ is in a range of 5 to 15% and preferably in a range of 5.5 to 14%.

For the crystallized glass according to the invention, $Y_2O_3$ is not a necessary component, but, as described in embodiments below, introduction of $Y_2O_3$ of 2%, for example, increases the Young's modulus of the crystallized glass by about 10 Gpa, so that the liquid temperature can be reduced by about 50 to 100° C. That is, introduction of $Y_2O_3$ in a small amount significantly improves characteristics and productivity of glass, and $Y_2O_3$ can be effective as far as the contained amount of $Y_2O_3$ is 0.8% or more. However, the $Y_2O_3$ has power to suppress the growth of the primary crystal contained in the glass. Therefore, if the contained amount of $Y_2O_3$ is too much, a surface crystallization occurs during a thermal treatment for crystallizing the glass, so that the aimed glass may not be produced. From this viewpoint, a proper contained amount of $Y_2O_3$ is equal to and less than 10%. Particularly, the contained amount of $Y_2O_3$ is preferably equal to or less than 8%.

As components other than the above, one or more oxides of alkali metals and alkali earth metals, such as $Li_2O$, $Na_2O$, $K_2O$, CaO, SrO, BaO, ZnO, NiO of 0 to 10 mol % and $B_2O_3$, $P_2O_5$, $R_2O_3$ (R is rare earth metal ions except Y), $ZrO_2$, $CeO_2$, $N_2O_5$ (N is Nb or Ta) of 0 to 5 mol % can be contained as far as the above oxides do not impair the characteristics belonging to the crystallized glass.

As an anti-bubbling agent, $As_2O_3$ and/or $Sb_2O_3$ can be contained for making the glass uniform. In accordance with the high temperature viscosity varied in association with the glass composition, addition of either or both of $As_2O_3$ and $Sb_2O_3$ to the glass in an appropriate amount creates a glass with further uniformity. If the addition amount of the anti-bubbling agent is too much, the specific gravity of the glass may increase to lower the Young's modulus, and a platinum crucible may inflict damages due to agent's reaction with the crucible for melting. It is therefore proper that the adding amount of the anti-bubbling agent is equal to or less than 2%, and preferably equal to or less than 1.5%.

Impurities in a raw material other than the above fundamental components, e.g., Cl, F, $SO_3$, and the like, which serve as a glass clarifier may be contained as far as the impurities are in an amount less than 1%, which do not impair the characteristics belonging to the crystallized glass.

The primary crystal phase of the crystallized glass according to the invention can be, e.g., an enstatite having a composition of $MgO.SiO_2$ and enstatite solid solution with components of $(Mg.Al)SiO_3$ and a quasi-stable quartz solid solution having one or more compositions selected from a group of $2MgO.2Al_2O_3.5SiO_2$, $MgO.Al_2O_3.3SiO_2$, and $MgO.Al_2O_3.4SiO_2$, or particularly, β-quartz solid solution. It is to be noted that the enstatite crystal phase includes clinoenstatite, protoenstatite, and one or more kinds of enstatites. With the crystallized glass of the invention, crystals other than the above such as spinel, mullite, $2MgO.SiO_2$, $MgO.SiO_2$, can be contained. The mean crystal size contained in the invented crystallized glass is preferably 3 microns or less, more preferably 1 micron or less, and further preferably 0.5 micron or less. If the mean of the crystal size exceeds 1 micron, it not only reduces the mechanical strength of the glass but also impairs surface roughness of the glass upon induction of defects of the crystal during polishing.

Third Embodiment [Crystallized Glass]

Each component constituting a glass for the invented crystallized glass (Third Embodiment) is described below.

$SiO_2$ is a glass material having a meshed structure and also serves as a structural component for, as major deposited crystals, a quasi-stable quartz solid solution such as $2MgO.2Al_2O_3.5SiO_2$, $MgO.Al_2O_3.3SiO_2$, and $MgO.Al_2O_3.4SiO_2$ and an enstatite having a component of $MgO.SiO_2$ and enstatite solid solution with components of $(Mg.Al)SiO_3$. Where $SiO_2$ is contained in an amount less than 35%, the melting glass becomes so unstable, thereby making molding at a high temperature hard and crystal depositions difficult. Furthermore, where $SiO_2$ is contained in an amount less than 35%, the residual glass matrix phase may suffer from impaired chemical resistance, and the glass tends to suffer from a worse heat resistance. On the other hand, where $SiO_2$ is contained in an amount more than 65%, the quasi-stable quartz solid solution and the enstatite as the primary crystal phase tend to be not readily deposited, and the Young's modulus of the glass tends to rapidly become small. Therefore, a proper contained amount of $SiO_2$ is in a range of 35 to 65% in consideration of deposited crystal species, deposited amounts, chemical resistance, heat resistance, molding property, and productivity. From a viewpoint to obtain a crystallized glass having more preferable property, the contained amount of $SiO_2$ is preferably in a range of 37 to 60%.

$Al_2O_3$ is an intermediate oxide of a glass and is a structural component of, as major crystal species, a quasi-stable quartz solid solution such as $2MgO.2Al_2O_3.5SiO_2$, $MgO.Al_2O_3.3SiO_2$, and $MgO.Al_2O_3.4SiO_2$. Introduction of $Al_2O_3$ promotes deposition of the quasi-stable quartz solid solution and contributes to improvements of surface hardness of the glass. However, if the contained amount of $Al_2O_3$ is less than 5%, the high Young's modulus crystal as described above may not be deposited well, and the glass matrix phase may suffer from impaired chemical resistance while the substrate material may lose the required strength. On the other hand, when the contained amount of $Al_2O_3$ exceeds 25 mol %, an enstatite as a primary crystal phase may be not readily deposited, and the glass may not be melted easily due to a high melting temperature while losing its transparency and easiness for molding. Therefore, in consideration of solubility of the glass, molding property at high temperature, deposited crystal species, and so on, the contained amount of $Al_2O_3$ is in a range of 5 to 25% and preferably in a range of 7 to 22%.

MgO is a modification component of the glass, has a crystal structure of the enstatite having a composition of $MgO.SiO_2$ and enstatite solid solution with components of $(Mg.Al)SiO_3$ or a quasi-stable quartz solid solution, and also serves as a main component of the crystal species having a composition such as $2MgO.2Al_2O_3.5SiO_2$, $MgO.Al_2O_3.3SiO_2$, or $MgO.Al_2O_3.4SiO_2$. Where the contained amount of MgO is less than 10%, the crystal as described above may not be deposited well, and the glass tends to lose the transparency and may be subject to a higher melting temperature, while a temperature span suitable for glass molding operation tends to be narrowed. On the other hand, if the contained amount of MgO exceeds 40%, the high temperature viscosity of the glass suddenly falls to render the glass thermally unstable, thereby impairing productivity, as well as lowering the Young's modulus and the durability. Therefore, in consideration of productivity, chemical resistance, high temperature viscosity, strength, and so on of the glass, the contained amount of MgO is in a range of 10 to 40% and preferably in a range of 12 to 37%.

It is to be noted that the contained amounts of MgO and $Al_2O_3$ are adjusted so that the mole ratio ($Al_2O_3$/MgO) is less than 0.9. If the mole ratio ($Al_2O_3$/MgO) is equal to or more than 0.9, the Young's modulus of the crystallized glass tends to drop suddenly. Where the ratio $Al_2O_3$/MgO is set less than 0.9, a crystallized glass having a high Young's modulus of 150 GPa or higher can be obtained. It is preferable to set the ratio $Al_2O_3$/MgO less than 0.5, more preferably the ratio $Al_2O_3$/MgO less than 0.45. However, if the mole ratio of $Al_2O_3$/MgO is too small, the high temperature viscosity of the glass may be made lower, and therefore, the ratio is properly 0.2 or higher, and more preferably 0.25 or higher.

$TiO_2$ is a nucleus forming agent for crystal phase deposition of the enstatite crystal having a composition of $MgO.SiO_2$ and enstatite solid solution with components of $(Mg.Al)SiO_3$ and the crystal phase of $2MgO.2Al_2O_3.5SiO_2$, $MgO.Al_2O_3.3SiO_2$, and $MgO.Al_2O_3.4SiO_2$ having a crystal structure of a quasi-stable quartz solid solution. $TiO_2$ also has an effect to suppress loss of glass transparency where the contained amount of $SiO_2$ is less. It is to be noted that where the contained amount of $TiO_2$ is less than 5%, a uniform crystallized glass may not be produced easily due to surface crystallization on the glass where $TiO_2$ does not serve adequately as the nucleus forming agent for primary crystal. On the other hand, where the contained amount of $TiO_2$ exceeds 15%, the glass may suffer from divided phases due to too lowered high temperature viscosity or from loss of transparency, thereby making the productivity of the glass extremely impaired. Consequently, in consideration of productivity, chemical resistance, high temperature viscosity, crystal nucleus production, and so on of the glass, the contained amount of $TiO_2$ is in a range of 5 to 15% and preferably in a range of 5.5 to 14%.

For the crystallized glass according to the invention, $Li_2O$ is a component to reduce the liquid phase temperature of the glass and to promote deposition of further fine crystal grains. For example, if $Li_2O$ of about 2% is introduced into a $MgO$—$Al_2O_3$—$SiO_2$—$TiO_2$ glass, the crystal grain size becomes about a half or below in comparison with a glass with no addition of $Li_2O$ while the Young's modulus of the glass is almost unchanged. Another remarkable role of $Li_2O$ is to lower the liquid temperature of the glass, and the liquid temperature of the glass can be reduced by about 50° C. upon introduction of $Li_2O$ of about 2%. However, if the contained amount of $Li_2O$ is too much, the glass remarkably shows divided phases and may suffer from worse productivity due to such as a larger tendency of the transparency loss. Therefore, a proper contained amount of $Li_2O$ is in a range of 0.2 to 10%, and a contained amount of $Li_2O$ is more preferably in a range of 0.5 to 8%.

For the crystallized glass according to the invention, $Y_2O_3$ is not a necessary component, but, as described in embodiments below, introduction of $Y_2O_3$ of 2%, for example, increases the Young's modulus of the crystallized glass by about 10 Gpa, so that the liquid temperature can be reduced by about 50 to 100° C. That is, introduction of $Y_2O_3$ in a small amount significantly improves characteristics and productivity of glass, and $Y_2O_3$ can be effective as far as the contained amount of $Y_2O_3$ is 0.8% or more. However, the $Y_2O_3$ has power to suppress the growth of the primary crystal contained in the glass. Therefore, if the contained amount of $Y_2O_3$ is too much, a surface crystallization occurs during a thermal treatment for crystallizing the glass, so that the aimed glass may not be produced. From this viewpoint, a proper contained amount of $Y_2O_3$ is equal to and less than 10%. Particularly, the contained amount of $Y_2O_3$ is preferably equal to or less than 8%.

As components other than the above, the crystallized glass of the invention can contain, as arbitrary components, $Na_2O$ of 0 to 10 mol %, $K_2O$ of 0 to 10 mol %, CaO of 0 to 10 mol %, SrO of 0 to 10 mol %, BaO of 0 to 10 mol %, ZnO of 0 to 10 mol %, NiO of 0 to 10 mol %, $R_2O_3$ of 0 to 5 mol % (wherein R is B ions or rare earth metal ions), $CeO_2$ of 0 to 5 mol %, $ZrO_2$ of 0 to 5 mol %, $N_2O_5$ of 0 to 5 mol % (wherein N is P ions, Nb ions, and Ta ions), $As_2O_3$ of 0 to 2 mol %, and $Sb_2O_3$ of 0 to 2 mol %.

Where the glass contains oxide components of alkali or alkali earth metal such as $Na_2O$, $K_2O$, CaO, SrO, BaO, ZnO, and NiO, the high temperature viscosity of the glass can be adjusted in suppressing the tendency of transparency loss and unifying the crystal grains. For example, if the above component is introduced into the crystallized glass of the invention in an amount of 2 to 5%, the Young's modulus is reduced more or less, but the introduction improves the glass productivity and unifies the size of the crystal grains, and other characteristics of the glass can be improved. In total consideration of respective glass features such as Young's modulus, productivity, surface smoothness of the crystallized glass, strength, and the like, the contained amounts of the oxide components of alkali metals and alkali earth metals such as $Na_2O$, $K_2O$, CaO, SrO, BaO, ZnO, and NiO, is preferably 10% or less, more preferably 7% or less.

Where $B_2O_3$ or $P_2O_5$ is contained in the invented crystallized glass, the loss of transparency can be suppressed mainly in a molding temperature range of the glass. It is to be noted that because those components reduce the Young's modulus of the glass significantly, a desirable contained amount is 5% or less. In consideration of the productivity of the glass, it is further desirable that the contained amount is 4% or less.

Where $R_2O_3$ (R is rare earth metal ions except Y), $CeO_2$, or $N_2O_5$ (N is Nb or Ta) is contained in the invented glass, the glass may have better thermal stability, productivity, and Young's modulus. Since those components also operate to suppress crystal grain growth, those components allow the glass to be produced with excellent surface smoothness. However, any of those oxides is expensive, and if introduced too much, those makes the liquid temperature of the glass worse and the specific gravity of the glass increase abruptly.

Therefore, it is proper to set that the contained amount is 5% or less. The introduction amount of $R_2O_3$ is properly set 5% or less, more preferably 4% or less, in consideration of productivity, specific gravity, liquid phase temperature of the glass.

As an anti-bubbling agent, $As_2O_3$ and/or $Sb_2O_3$ can be contained in the invented glass for making the glass uniform. In accordance with the high temperature viscosity varied in association with the glass composition, addition of either or both of $As_2O_3$ and $Sb_2O_3$ to the glass in an appropriate amount creates a glass with further uniformity. If the addition amount of the anti-bubbling agent is too much, the specific gravity of the glass may increase to lower the Young's modulus, and a platinum crucible may inflict damages due to agent's reaction with the crucible for melting. It is therefore proper that the adding amount of the anti-bubbling agent is equal to or less than 2%, and preferably equal to or less than 1.5%.

Impurities in a raw material other than the above fundamental components, e.g., Cl, F, $SO_3$, and the like, which serve as a glass clarifier may be contained as far as the impurities are in an amount less than 1%, which do not impair the characteristics belonging to the crystallized glass.

The primary crystal phase of the crystallized glass according to the invention can be, e.g., an enstatite having a composition of $MgO.SiO_2$ and enstatite solid solution with components of $(Mg.Al)SiO_3$ and a quasi-stable quartz solid solution having one or more compositions selected from a group of $2MgO.2Al_2O_3.5SiO_2$, $MgO.Al_2O_3.3SiO_2$, and $MgO.Al_2O_3.4SiO_2$, or particularly, β-quartz solid solution. It is to be noted that the enstatite crystal phase includes clinoenstatite, protoenstatite, and one or more kinds of enstatites. With the crystallized glass of the invention, crystals other than the above, such as spinel, mullite, $2MgO.SiO_2$, $MgO.SiO_2$, and Mg—Al-titanate can be contained.

The mean crystal size of the enstatite and quasi-stable quartz solid solution contained in the invented crystallized glass is preferably 1 micron or less. Where the mean crystal size of the crystal grains is set 1 micron or less, the crystallized glass can be formed with excellent strength and surface smoothness. If the mean crystal grain size exceeds 1 micron, it not only reduces the mechanical strength of the glass but also impairs surface roughness of the glass upon induction of defects of the crystal during polishing. The mean grain size of the crystal grain is preferably 0.5 micron or less.

Fourth Embodiment [Crystallized Glass]

Components constituting the invented crystallized glass (Fourth Embodiment) are indicated on an oxide basis as well as the original glass. The reason that the component ranges of the original glass are restricted in a way as described above is as follows.

$SiO_2$ is a glass material having a meshed structure and also serves as a structural component for, as major deposited crystals, a quasi-stable quartz solid solution and an enstatite. $SiO_2$ also serves as a structural component of β-spodumene though not a primary crystal. Where $SiO_2$ is contained in an amount less than 42%, the melting glass becomes so unstable, thereby making molding at a high temperature hard and depositions of the above crystal difficult as the primary crystal. Furthermore, where $SiO_2$ is contained in an amount less than 42%, the residual glass matrix phase may suffer from impaired chemical resistance, and the glass tends to suffer from a worse heat resistance. On the other hand, where $SiO_2$ is contained in an amount more than 65%, the Young's modulus of the glass tends to rapidly become small.

Therefore, a proper contained amount of $SiO_2$ is in a range of 42 to 65% in consideration of deposited crystal species, deposited amounts, Young's modulus, chemical resistance, heat resistance, molding property, and productivity. A preferable lower limit is 45% or higher, more preferably, 48% or higher, and a preferable upper limit is 62% or lower, more preferably, 60% or lower.

$Al_2O_3$ is an intermediate oxide of a glass and is a structural component of, as major crystal species, a quasi-stable quartz solid solution. Introduction of $Al_2O_3$ promotes deposition of the quasi-stable quartz solid solution crystal and contributes to improvements of surface hardness of the glass. However, if the contained amount of $Al_2O_3$ exceeds 15%, the glass may not be molded well while becoming not readily melting due to a high melting temperature and a liquid phase temperature. Therefore, the contained amount of $Al_2O_3$ is set equal to or less than 15%. In consideration of solubility of the glass, molding property at high temperature, deposited crystal species, and so on, the contained amount of $Al_2O_3$ is in a range of 0 to 15%. The lower limit is preferably 1% or higher, more preferably 2% or higher, and the upper limit is preferably 10% or lower, more preferably 7% or lower. The total amount of $SiO_2$ and $Al_2O_3$ is preferably 50% or higher, more preferably 55% or higher, from a viewpoint to give a high temperature viscosity allowing the glass to be molded.

MgO is a very important component having effects for producing the quartz solid solution and the enstatite from a thermal treatment of the original glass with $SiO_2$ and for maintaining transparency in improving the hardness and heat resistance. However, if the contained amount of MgO is less than 5%, the above effects cannot be obtained. As the contained amount of MgO is less, the glass more tends to lose its transparency and to increase the melting temperature, so that the contained amount of MgO is set 5% or higher. On the other hand, if the contained amount of MgO exceeds 30%, the liquid phase temperature of the glass suddenly becomes higher, thereby impairing productivity, as well as furnishing property. Therefore, the contained amount of MgO is set 30% or less. In consideration of productivity, melting property, mechanical strength, and the like of the glass, the contained amount of MgO is in a range of 5 to 30%. The lower limit is preferably 7% or higher, more preferably 10% or higher, and the upper limit is preferably 25% or lower, more preferably 20% or lower.

The crystallized glass includes $Y_2O_3$. Introduction of $Y_2O_3$ of at least 0.5% increases the Young's modulus of the crystallized glass by about 5 Gpa, so that the liquid temperature can be reduced by about 50° C. Furthermore, introduction of $Y_2O_3$ of at least 0.5% improves thermal stability of the glass. Thus, introduction of $Y_2O_3$ in a small amount significantly improves characteristics and productivity of glass. However, since the $Y_2O_3$ has power to suppress the growth of the primary crystal contained in the glass, if the contained amount of $Y_2O_3$ is too much, a surface crystallization occurs during a thermal treatment for crystallizing the glass, so that the crystallized glass may not be produced with the aimed surface smoothness. Therefore, the contained amount of $Y_2O_3$ is set 8% or less. The lower limit of the contained amount of $Y_2O_3$ is preferably 0.5% or higher, more preferably 1% or higher, and the upper limit of the contained amount of $Y_2O_3$ is preferably 5% or lower, more preferably 3% or lower.

$Li_2O$ is a component having effects for producing crystals of the quartz solid solution and the β-spodumene solid solution from a thermal treatment of the original glass with $SiO_2$ and for reducing the liquid phase temperature and crystallization treatment temperature of the glass. If the contained amount of $Li_2O$ is 10% or less, the above effects cannot be obtained. Furthermore, if the contained amount of $Li_2O$ is 10% or less, the glass has a higher melting temperature, so that the glass disc molding has a narrower working temperature span. Therefore, it is appropriate to set the contained amount of $Li_2O$ as exceeding 10%. On the other hand, if the contained amount of $Li_2O$ exceeds 25%, the glass becomes very unstable, and the obtained crystallized glass tends to have a greatly low Young's modulus. The contained amount of $Li_2O$ is therefore set 25% or less. In consideration of productivity, melting property, mechanical strength, and the like of the glass, the lower limit of the contained amount of $Li_2O$ is preferably 10.5% or higher, more preferably 11% or higher, and the upper limit of the contained amount of $Li_2O$ is preferably 22% or lower, more preferably 20% or lower.

The crystallized glass according to the invention includes, as a primary crystal phase, either or both of a quartz solid solution and an enstatite. The crystal phase of the quartz solid solution is a quasi-stable quartz solid solution having one or more compositions selected from a group of $2MgO.2Al_2O_3.5SiO_2$, $MgO.Al_2O_3.3SiO_2$, and $MgO.Al_2O_3.4SiO_2$, or particularly, β-quartz solid solution. The crystal phase of the enstatite is an enstatite crystal phase having a composition of $MgO.SiO_2$ and enstatite solid solution with components of $(Mg.Al)SiO_3$. It is to be noted that the enstatite crystal phase includes clinoenstatite, protoenstatite, and one or more kinds of enstatites. With the crystallized glass of the invention, crystals other than the above, such as β-spodumene solid solution can be contained as crystal phases.

The crystal contained in the invented crystallized glass preferably has crystal grain sizes capable of forming a polished surface whose surface roughness Ra on the invented crystallized glass is in a range of 0.1 to 0.9 nm, and more preferably, crystal grain sizes capable of forming a polished surface whose surface roughness Ra is in a range of 0.1 to 0.5 nm. Where the crystal grain sizes of the crystal phase contained in the crystallized glass meet the above range, the glass can provide an information recording disc having excellent surface smoothness.

With the crystallized glass of the invention, it is preferable to select the component of the glass so that the liquid phase temperature of the original glass is 1200° C. or less. More preferably, it is selected so that the liquid phase temperature of the original glass is 1150° C. or less. Where the original glass has a lower liquid phase temperature, the crystallized glass substrate can be produced easily. That is, because no very high temperature is required for the steps of melting, molding, and the like of the raw material done at the manufacturing process for the glass substrate, the glass can be advantageously produced with ease where wide variations are available for choices of melting furnaces and materials for forming molding.

$TiO_2$, $ZrO_2$, and $P_2O_5$ operate as forming agents for crystal nucleus and promote deposition of fine crystal gains such as the quartz solid solution and the enstatite. Those also serve as components to give the glass thermal stability where the contained amount of $SiO_2$ is relatively small. Accordingly, the crystallized glass of the invention preferably contains at least one kind of $TiO_2$, $ZrO_2$, and $P_2O_5$. If the total contained amount of $TiO_2$, $ZrO_2$, and $P_2O_5$ is 5% or less at that time, an effect for nucleus forming agents for primary crystal may not be obtained adequately, so that surface crystallization occurs on the glass, and so that the uniform crystallized glass tends to be hard to be obtained.

Therefore, the total contained amount of $TiO_2$, $ZrO_2$, and $P_2O_5$ is preferably 5% or more. On the other hand, if the total contained amount of $TiO_2$, $ZrO_2$, and $P_2O_5$ is preferably 18% or more, the glass may suffer from divided phases due to too lowered high temperature viscosity or from loss of transparency, thereby making the productivity of the glass extremely impaired. Therefore, the total contained amount of $TiO_2$, $ZrO_2$, and $P_2O_5$ is preferably 18% or less. Consequently, in consideration of productivity, chemical resistance, high temperature viscosity, crystal nucleus production, and so on of the glass, the total contained amount of $TiO_2$, $ZrO_2$, and $P_2O_5$ is in a range of 5 to 18%. The lower limit of the total contained amount of $TiO_2$, $ZrO_2$, and $P_2O_5$ is preferably 6% or higher, more preferably 7% or higher, and the upper limit is preferably 15% or lower, more preferably 13% or lower.

The oxide components of alkali or alkali earth metal such as $Na_2O$, $K_2O$, CaO, SrO, BaO, ZnO, and NiO can adjust mainly the high temperature viscosity of the glass, suppressing the tendency of transparency loss and unifying the crystal grains. If at least one of the above components is added to the glass, the Young's modulus may be reduced more or less, but this addition improves the glass productivity and unifies the size of the crystal grains, and other characteristics of the glass can be improved. In consideration of respective glass features such as Young's modulus, productivity, surface smoothness of the crystallized glass, strength, and the like, the contained amounts of $Na_2O$ is in a range of 0 to 10%; the contained amount of $K_2O$ is in a range of 0 to 10%; and the contained amount of $Na_2O$ and $K_2O$ is preferably 10% or less. More preferably, the contained amount of $Na_2O$, $K_2O$, and $Na_2O+K_2O$ is 8% or less. Similarly, the contained amount of CaO is in a range of 0 to 10%; the contained amount of SrO is in a range of 0 to 10%; the contained amount of BaO is in a range of 0 to 10%; the contained amount of ZnO is in a range of 0 to 10%; the contained amount of NiO is in a range of 0 to 10%; the contained amount of CaO, SrO, BaO, ZnO, and NiO is preferably 10% or less. Moreover, the contained amount of CaO, SrO, BaO, ZnO, and NiO and the total of CaO, SrO, BaO, ZnO, and NiO is preferably 8% or less.

The crystallized glass according to the invention, as far as does not lose any characteristics of the glass, in addition to the above components, can contain some rare earth metal oxide component such as $B_2O_3$, $Nb_2O_5$, $Ta_2O_5$ and $La_2O_3$. However, those components significantly reduce the Young's modulus of the glass. Therefore, the contained amount of $B_2O_3$ is in a range of 0 to 5%; the contained amount of $R_2O_3$ is in a range of 0 to 5% (wherein R is rare earth metal ions (e.g., $Nd^{3+}$, $Pr^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$)); the contained amount of $CeO_2$ is in a range of 0 to 5%; the contained amount of $N_2O_5$ is in a range of 0 to 5% (wherein N is Nb or Ta); and the total of $B_2O_3$, $R_2O_3$, $CeO_2$, and $N_2O_5$ is preferably equal to or less than 5 mol %. In consideration of productivity of the glass, the contained amount of each component and the contained amount of the total are preferably set 4% or less.

$As_2O_3$ and $Sb_2O_3$ are components to be added as anti-bubbling agents, to make uniform the glass as a raw material for crystallized glass. Addition of either or both of $As_2O_3$ and $Sb_2O_3$ to the glass in an appropriate amount according to the high temperature viscosity of the respective glasses, creates a glass with further uniformity. If the addition amount of the anti-bubbling agent is too much, the specific gravity of the glass may increase to lower the Young's modulus, and a platinum crucible may inflict damages due to agent's reaction with the crucible for melting. Therefore, the contained amount of $As_2O_3$ is in a range of 0 to 2%; the contained amount of $Sb_2O_3$ is in a range of 0 to 2%; the total of $As_2O_3$ and $Sb_2O_3$ is preferably equal to or less than 2 mol %. Particularly, the contained amount of $As_2O_3$, $Sb_2O_3$ and the total of $As_2O_3$ and $Sb_2O_3$ are preferably set 1.5% or less.

Fifth Embodiment [Crystallized Glass]

Components constituting the invented crystallized glass (Fifth Embodiment) are indicated on an oxide basis as well as the original glass. The reason that the component ranges of the original glass are restricted in a way as described above is as follows.

$SiO_2$ is a glass material having a meshed structure and also serves as a structural component for, as major deposited crystals, an enstatite and a quasi-stable quartz solid solution. Where $SiO_2$ is contained in an amount less than 35%, the melting glass becomes so unstable, thereby making molding at a high temperature hard and depositions of the above crystal difficult. Furthermore, where $SiO_2$ is contained in an amount less than 35%, the residual glass matrix phase may suffer from impaired chemical resistance, and the glass may suffer from worse heat resistance. On the other hand, where $SiO_2$ is contained in an amount more than 55%, the Young's modulus of the glass tends to rapidly become small. Therefore, in consideration of deposited crystal species, deposited amounts, chemical resistance, heat resistance, molding property, and productivity, a lower limit of the contained amount of $SiO_2$ is 35% while a preferable upper limit is 55%. A preferable lower limit is 37% or higher, more preferably, 40% or higher, and a preferable upper limit is 54% or lower, more preferably, 53% or lower.

$Al_2O_3$ is an intermediate oxide of a glass and is a structural component of, as major crystal species, a quasi-stable quartz solid solution. Introduction of $Al_2O_3$ promotes deposition of the quasi-stable quartz solid solution crystal and contributes to improvements of surface hardness of the glass. However, if the contained amount of $Al_2O_3$ exceeds 5%, the glass may not be molded well while becoming not readily melting due to a high melting temperature and a liquid phase temperature. Therefore, the contained amount of $Al_2O_3$ is set equal to or less than 5%. In consideration of solubility of the glass, molding property at high temperature, deposited crystal species, and so on, the lower limit of the contained amount of $Al_2O_3$ is preferably 0%, more preferably 1%. The upper limit of the contained amount of $Al_2O_3$ is preferably 4.5%, more preferably 4%.

It is to be noted that although $Al_2O_3$ may not be contained in the glass, the total contained amount of $SiO_2$ and $Al_2O_3$ is preferably 40 mol % or higher from a viewpoint to give the glass adequate chemical resistance and thermal stability enabling mass-production. Therefore, in the case that $Al_2O_3$ is not contained, the contained amount of $SiO_2$ is 40 mol % or more. The total contained amount of $SiO_2$ and $Al_2O_3$ is preferably 42 mol % or higher.

MgO is a component having effects for producing the enstatite crystal from a thermal treatment of the original glass with $SiO_2$ and for maintaining transparency in improving the hardness and heat resistance. If the contained amount of MgO is less than 25%, the above effects cannot be obtained. Therefore, the contained amount of MgO is set 25% or higher. On the other hand, if the contained amount of MgO exceeds 45 mol %, the high temperature viscosity of the glass suddenly falls to make the glass thermally unstable, thereby impairing productivity, as well as furnishing property. Therefore, the contained amount of MgO is set 45% or less. In consideration of productivity, chemical resistance, high temperature viscosity, strength, and the like of the glass, regarding the contained amount of MgO, the lower limit is 25% while the upper limit is 45%. The lower limit is preferably 28%, more preferably 32%, and the upper limit is preferably 43%, more preferably 42%.

The crystallized glass includes $Y_2O_3$. Introduction of $Y_2O_3$ of at least 0.5% increases the Young's modulus of the crystallized glass by about 5 Gpa, so that the liquid temperature can be reduced by about 50° C. Furthermore, introduction of $Y_2O_3$ of at least 0.5% improves thermal stability of the glass. Thus, introduction of $Y_2O_3$ in a small amount significantly improves characteristics and productivity of glass. However, since the $Y_2O_3$ has power to suppress the growth of the primary crystal contained in the glass, if the contained amount of $Y_2O_3$ is too much, a surface crystallization occurs during a thermal treatment for crystallizing the glass, so that the crystallized glass may not be produced with the aimed surface smoothness. Therefore, the contained amount of $Y_2O_3$ is set 8% or less. The lower limit of the contained amount of $Y_2O_3$ is preferably 0.5% or higher, more preferably 1% or higher, and the upper limit of the contained amount of $Y_2O_3$ is preferably 5% or lower, more preferably 3% or lower.

$TiO_2$ and $ZrO_2$ are necessary components for depositions of the crystal grains such as the quartz solid solution and the enstatite as forming agents for crystal nucleus, and also have an effect to give the glass a thermal stability where the contained amount of $SiO_2$ is less. Where the total contained amount of $TiO_2$ and $ZrO_2$ is less than 4.5%, a uniform crystallized glass may not be produced easily due to surface crystallization on the glass, because $TiO_2$ and $ZrO_2$ does not serve adequately as the nucleus forming agent for primary crystal. Accordingly, the total contained amount of $TiO_2$ and $ZrO_2$ is 4.5% or higher. If the contained amount of $TiO_2$ and $ZrO_2$ exceeds 18%, the glass may suffer from divided phases due to too lowered high temperature viscosity or from loss of transparency, thereby making the productivity of the glass extremely impaired. Accordingly, the total contained amount of $TiO_2$ and $ZrO_2$ is 18% or lower. In consideration of productivity, chemical resistance, high temperature viscosity, crystal nucleus production, and so on of the glass, the lower limit of the total contained amount of $TiO_2$ and $ZrO_2$ is 4.5%, and the upper limit is 18%. The lower limit of the total contained amount of $TiO_2$ and $ZrO_2$ is preferably 5%, and the upper limit is preferably 15%. It is to be noted that it is appropriate that the contained amount of $ZrO_2$ is in a range of 0 to 10 mol % and that the contained amount of $TiO_2$ is in a range of 0 to 12 mol %, in consideration of the high temperature melting property and thermal stability of the glass.

The crystallized glass according to the invention includes, as a primary crystal phase, either or both of a quartz solid solution and an enstatite. The crystal phase of the quartz solid solution is a quasi-stable quartz solid solution having one or more compositions selected from a group of $2MgO.2Al_2O_3.5SiO_2$, $MgO.Al_2O_3.3SiO_2$, and $MgO.Al_2O_3.4SiO_2$, or particularly, β-quartz solid solution. The crystal phase of the enstatite is an enstatite crystal phase having a composition of $MgO.SiO_2$ and enstatite solid solution with components of $(Mg.Al)SiO_3$. It is to be noted that the enstatite crystal phase includes clinoenstatite, protoenstatite, and one or more kinds of enstatites.

The crystal contained in the invented crystallized glass preferably has crystal grain sizes capable of forming a polished surface whose surface roughness Ra on the invented crystallized glass is in a range of 0.1 to 0.9 nm, and more preferably, crystal grain sizes capable of forming a polished surface whose surface roughness Ra is in a range of 0.1 to 0.5 nm. Where the crystal grain sizes of the crystal phase contained in the crystallized glass meet the above range, the glass can provide an information recording disc having excellent surface smoothness.

Alkali metal oxides such as $Li_2O$, $Na_2O$, and $K_2O$ are additive components to decrease the liquid phase temperature of the glass and to make deposition of further fine crystal grains. For example, if $Li_2O$ of about 2% is introduced into a $MgO—Al_2O_3—SiO_2—TiO_2$ glass, the crystal grain size becomes about a half or below in comparison with a glass with no addition of $Li_2O$ while the Young's modulus of the glass is almost unchanged. Another remarkable role of $Li_2O$, $Na_2O$, and $K_2O$ is to lower the liquid temperature of the glass, and the liquid temperature of the glass can be reduced by about 50° C. upon introduction of the alkali metal oxides of about 2%. However, if the contained amount of alkali components such as $Li_2O$ is too much, the glass may suffer from worse productivity due to such as a lower Young's modulus of the glass and a larger tendency of the transparency loss. Therefore, a total introduction amount of $Li_2O$, $Na_2O$, and $K_2O$ is 5% or less. The total introduction amount of $Li_2O$, $Na_2O$, and $K_2O$ is more preferably 4% or less.

The oxide components of alkali earth metal such as CaO, SrO, BaO, ZnO, and NiO can adjust mainly the high temperature viscosity of the glass, suppressing the tendency of transparency loss and unifying the crystal grains. If at least one of the above components is added to the glass, the Young's modulus may be reduced more or less, but this addition improves the glass productivity and unifies the size of the crystal grains, and other characteristics of the glass can be improved. In consideration of respective glass features such as Young's modulus, productivity, surface smoothness of the crystallized glass, strength, and the like, the contained amount of CaO is in a range of 0 to 10%; the contained amount of SrO is in a range of 0 to 10%; the contained amount of BaO is in a range of 0 to 10%; the contained amount of ZnO is in a range of 0 to 10%; the contained amount of NiO is in a range of 0 to 10%; the contained amount of CaO, SrO, BaO, ZnO, and NiO is preferably 10% or less. Moreover, the contained amount of CaO, SrO, BaO, ZnO, and NiO and the total of CaO, SrO, BaO, ZnO, and NiO is preferably 8% or less.

The crystallized glass according to the invention, as far as does not lose any characteristics of the glass, in addition to the above components, can contain some rare earth metal oxide component such as $B_2O_3$, $P_2O_5$, $Nb_2O_5$, $Ta_2O_5$ and $La_2O_3$. However, those components significantly reduce the Young's modulus of the glass. Therefore, the contained amount of $B_2O_3$ is in a range of 0 to 5%; the contained amount of $P_2O_5$ is in a range of 0 to 5%; the contained amount of $R_2O_3$ is in a range of 0 to 5% (wherein R is rare earth metal ions (e.g., $Nd^{3+}$, $Pr^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$)); the contained amount of $CeO_2$ is in a range of 0 to 5%; the contained amount of $N_2O_5$ is in a range of 0 to 5% (wherein N is Nb or Ta); and the total of $B_2O_3$, $P_2O_5$, $R_2O_3$, $CeO_2$, and $N_2O_5$ is preferably equal to or less than 5 mol %. In consideration of productivity of the glass, the contained amount of each component and the contained amount of the total are preferably set 4% or less.

$As_2O_3$ and $Sb_2O_3$ are components to be added as anti-bubbling agents, to make uniform the glass as a raw material for crystallized glass. Addition of either or both of $As_2O_3$ and $Sb_2O_3$ to the glass in an appropriate amount according to the high temperature viscosity of the respective glasses, creates a glass with further uniformity. If the addition amount of the anti-bubbling agent is too much, the specific gravity of the glass may increase to lower the Young's modulus, and a platinum crucible may inflict damages due to agent's reaction with the crucible for melting. Therefore, the contained amount of $As_2O_3$ is in a range of 0 to 2%; the contained amount of $Sb_2O_3$ is in a range of 0 to 2%; the total of $As_2O_3$ and $Sb_2O_3$ is preferably equal to or less than 2 mol %. Particularly, the contained amount of $As_2O_3$, $Sb_2O_3$ and the total of $As_2O_3$ and $Sb_2O_3$ are preferably set 1.5% or less.

Crystallized Glass and Manufacturing Method for Substrate

The crystallized glass and substrate according to the invention can be manufactured using known manufacturing methods for glass. For example, in a high temperature melting method, a glass raw material of a prescribed blend is melt in air or an inert gas atmosphere; the glass is unified by bubbling, adding anti-bubbling agents, or stirring; the glass is molded into glass plates by a method such as a known pressing method and a down drawing molding method; the glass is then subject to furnishing such as grinding or polishing, to produce glass molded articles having desired sizes and shapes. When the final products are substrates, the glass molded articles can be formed in consideration of the shape of the substrates.

The obtained glass molded articles are then subject to a thermal treatment for crystallization. There is no special limitation on the thermal treatment method, and it can be selected in accordance with the contained amount of the crystallization promoting agent, the glass transition temperature, the peak temperature for crystallization. It is preferable, from a viewpoint to make smaller the crystal, that the crystal is grown at a raised temperature 850 to 1150° C. after the glass is thermally treated at a relatively low temperature (e.g., 700 to 850° C.) at the initial stage to generate many crystal nucleuses. To manufacture the crystallized glass of the invention, systematic changes of the schedules for the thermal treatments and glass compositions allow the deposited crystal sizes and crystal amounts to be controlled, thereby capable of adjusting widely the property of the crystallized glasses. In this invention, the manufacturing process for crystallization can be controlled easily because the permissive temperature range for thermal treatment for production of crystal nucleuses and thermal treatment for crystal growth for forming crystallized glasses having the same Young's modulus, the same crystal grain size, and the same homogeneity of crystallization has a temperature span of 30° C. or more.

With the crystallized glass according to the invention, the glass has a crystal structure of the enstatite crystal phase having the composition of $MgO.SiO_2$ and enstatite solid solution with components of $(Mg.Al)SiO_3$ from the thermal treatment or a quartz solid solution, and it is appropriate to use a thermal condition for depositing, as a primary crystal, at least one kind among crystals having compositions such as $2MgO.2Al_2O_3.5SiO_2$, $MgO.Al_2O_3.3SiO_2$, and $MgO.Al_2O_3.4SiO_2$. It is to be noted that although $2MgO.SiO_2$, spinel, mullite, or other crystals, as primary crystals other than the above, can be deposited, it is desirable to set a condition for depositing, as the primary crystal phase, the enstatite crystal phase (the enstatite crystal phase includes clinoenstatite, protoenstatite, and one or more kinds of enstatites) and a quasi-stable quartz solid solution, or particularly, β-quartz solid solution. The treatment temperature for crystallization is kept at a low temperature as much as possible as a such condition. For example, it is appropriate to set the condition at 1150° C. or less. It is also appropriate to set the treatment temperature for nucleus production at a temperature 30 to 60° C. higher than the glass transition temperature.

The molded articles of the crystallized glass to which the thermal treatment is already finished can be polished when necessary, and there is no restriction on the polishing method. The glass molded articles can be polished by known methods in use of synthetic hone particles such as artificial or synthetic diamonds, silicon carbides, aluminum oxides, and boron carbides, and natural hone particles such as natural diamonds, cerium oxides, and the like. The substrate for information recording medium according to the invention made of the invented crystallized glass can be obtained by forming the molded articles into the shapes of the substrates in use of the above method.

The substrate made from the invented crystallized glass preferably has a surface smoothness in which the mean roughness Ra measured by an AFM is 20 angstroms or less. Particularly, where the crystallized glass of the invention is used for a magnetic disc substrate, the mean roughness Ra on the surface greatly affects the recording density of the magnetic disc. If the surface roughness exceeds 20 angstroms, a high recording density may not be achieved. The surface roughness of the substrate made from the invented crystallized glass is preferably 15 angstroms or less in consideration of a high recording density of the magnetic disc, more preferably, 10 angstroms or less.

The substrate made of the crystallized glass according to the invention including, as primary crystals, at least one of quartz solid solution crystals selected from $2MgO.2Al_2O_3.5SiO_2$, $MgO.Al_2O_3.3SiO_2$, and $MgO.Al_2O_3.4SiO_2$ and/or the enstatite crystal phase is useful for magnetic disc substrates because of the high strength, high rigidity, high Young's modulus with excellent chemical resistance and heat resistance. Since the crystallized glass of the invention is free of alkali or of low alkali, the magnetic film can be kept in the best state by reducing greatly corrosions between the substrate and the magnetic film even where used for the magnetic disc substrate.

The magnetic disc substrate made of the crystallized glass of the invention can satisfy all conditions required for magnetic disc substrate such as surface smoothness, flatness, strength, rigidity, chemical resistance, and heat resistance. The substrate has a Young's modulus about twice in comparison with a conventional crystallized glass ($Li_2O$—$Si_2O$ crystallized glass), so that the substrate can suppress in a smaller amount the warp occurring due to high speed rotation of the disc, and so that it is suitable for a substrate material for realizing high TPI hard discs.

Since the crystallized glass according to the invention has good property of heat resistance, surface smoothness, chemical resistance, optical characteristics, and mechanical strength, it can be used for substrates for information recording medium, glass substrates for opto-magnetic disc, glass substrates for opto-electronics such as optical discs, heat resistance substrates for low temperature polysilicon liquid crystal display as expected as LCD of the next generation, and glass substrates for electrical or electronic parts.

Description for Magnetic Disc

An information recording medium according to the invention has a feature having the invented substrate and a recording layer formed on the substrate. Hereinafter, a magnetic disc (hard disc) is described in which at least a magnetic layer is formed on a major surface of the substrate made of the crystallized glass of the invention.

As layers other than the magnetic layer, exemplified are, in terms of functions, an undercoat layer, a protection layer, a lubrication layer, an undulation control layer, and the like, which are formed when necessary. Those layers are formed in use of various thin film formation technologies. The material for the magnetic layer is not limited specifically. As such a magnetic layer, for example, Co based, ferrite based, and iron-rare earth based magnetic layers are exemplified. The magnetic layer can be for either of horizontal magnetic recording and vertical magnetic recording.

As a magnetic layer, for example, magnetic thin films such as CoPt, CoCr, CoNi, CoNiCr, CoCrTa, CoPtCr, coNiCrPt, CoNiCrTa, CoCrPtTa, CoCrPtSiO, in which Co is used as the main component, are exemplified. The magnetic layer can be divided with non-magnetic layers to form multilayer structure for aiming noise reduction.

The undercoat layer for the magnetic layer is selected according to the magnetic layer. As an undercoat layer, undercoat layers made of at least one material selected from non-magnetic metals such as Cr, Mo, Ta, Ti, W, V, B, and Al, or oxide, nitride, carbide, or the like of those metals. In the case of the magnetic layer made of a Co as a major component, Cr solely or Cr alloy is preferably used in terms of improvements for magnetic property. The undercoat layer is not limited to a single layer and can have a multilayer structure in which the same or different layers are accumulated. For example, an undercoat layer having multiple layers such as Al/Cr/CrMo, Al/Cr/Cr, or the like is exemplified.

An undulation control layer may be formed between the substrate and the magnetic layer or on a top of the magnetic layer to prevent the magnetic head and the magnetic disc from absorbing to each other. By forming the undulation control layer, the surface roughness on the magnetic disc is properly adjusted, thereby preventing the magnetic head and the magnetic disc from absorbing to each other, and thereby providing a magnetic disc highly reliable. Several materials for undulation control layers and forming methods are known, and not limited to those. For example, as a material for undulation control layer, undercoat layers made of at least one metal selected from a group of Al, Ag, Ti, Nb, Ta, Bi, Si, Zr, Cr, Cu, Au, Sn, Pb, Sb, Ge, Mg, and the like, an alloy made from those, oxides, nitrides, and carbides of those are exemplified. From a viewpoint for easy formation, it is desirable to use a metal having a main component of Al such as Al sole, Al alloy, Al oxide, and Al nitride.

In view of head extension, the surface roughness on the undulation control layer is preferably set Rmax=50 to 300 angstroms. A more desirable range is Rmax=100 to 200 angstroms. If Rmax is only 50 angstroms, the magnetic head surface is close to a flat, and thereby the magnetic head and the magnetic disc are absorbed to each other to inflict damages on the magnetic head and the magnetic disc or to unfavorably cause a head clash due to absorbing. If Rmax exceeds 300 angstroms, grind height becomes too large, thereby causing unfavorably reduction of recording density.

It is to be noted that certain undulation can be applied on the glass substrate surface without forming any undulation control layer by etching or laser beam radiation, as a texturing process.

As a protection layer, for example, Cr film, Cr alloy film, carbon film, zirconium film, silica film, and the like can be exemplified. Those protection films can be formed successively in an in-line sputtering apparatus or the like together with the undercoat layer, the magnetic layer, and the like. Those protection layers can be formed as a single layer or may have a multilayer structure made of the same or different layers.

On the protection layer, or in lieu of the protection layer, another protection layer can be formed. For example, tetraalkoxysilane may be applied on the protection layer upon diluting with a solvent based on an alcohol in dispersing colloidal silica fine particles and may be sintered to form an silicon oxide film. In such a case, it serves for both functions of the protection film and the undulation control layer.

Although various proposals are made as a lubrication layer, as a general rule, a perfluoropolyether serving as a liquid lubricant is diluted with fluorine based solvent, and is coated on the medium surface by a dipping method, a spin coating method, or a spray method, thereby forming the layer in thermally treating it when necessary.

EXAMPLES

Although this invention is described in detail by exemplifying the following Examples, this invention is not limited to those Examples.

Examples 1—1 to 3-19

Glass compositions of Examples 1—1 to 1-16 are shown in Tables 1, 2 by mol %. Glass compositions of Examples 2-1 to 2-18 are shown in Tables 3, 4 by mol %. Glass compositions of Examples 3-1 to 3-19 are shown in Tables 5, 6 by mol %. As a starting raw material for melting such a glass, $SiO_2$, $Al_2O_3$, $Al(OH)_3$, MgO, $CaCO_3$, $Y_2O_3$, $TiO_2$, $ZrO_2$, $Li_2CO_3$, and the like were used in a prescribed blend shown in Tables 1, 2 where measured to be 250 to 300 g to form a ready-mixed batch upon adequate mixing, and then, the materials were introduced in a platinum crucible to melt the glass for four to five hours in open air in stirring at 1550° C. After melting, the glass liquid was casted into a carbon made mold in a size of 180×15×25 mm and was subsequently placed in an anneal furnace right after the glass liquid was slowly cooled to the glass transition temperature, and it was further cooled to room temperature in the furnace upon one hour annealing in a temperature span of the glass transition point. The obtained glass did not show any deposited crystal observable by means of a microscope.

The glass in the size of 180×15×25 mm was placed in a thermal furnace after polished to sizes of 100×10×10 mm, 10×10×20 mm, and 10×1×20 mm. The glass was heated to a first thermal treatment temperature shown in Tables 1, 2 at a temperature increase rate of 1 to 5° C. per minute, and was subject to the first thermal treatment while kept at the temperature for two to ten hours. The glass was then heated to a second thermal treatment temperature shown in Tables 1, 2 at a temperature increase rate of 2 to 10° C. per minute from the first thermal treatment temperature right after the first thermal treatment ends, and was kept at the temperature for one to five hours, and a crystallized glass was produced by cooling the glass to room temperature in the furnace. The obtained crystallized glass was polished to have a length of 95 mm as a sample for measurements of Young's modulus and specific gravity. The Young's modulus was measured by an ultrasound method using a 95×10×10 mm sample. Data measured thus are shown in Tables 1 to 6 together with the glass compositions.

For the purpose of comparison, Comparative Example 1 for an ion exchange glass substrate disclosed in Japanese Unexamined Patent Publication No. 1-239,036, and Comparative Example 2 for a glass substrate disclosed in U.S. Pat. No. 2,516,553 are shown with their compositions and characteristics in Table 7.

TABLE 1

Crystallized glass compositions and property of Examples

| Oxide | 1-1 | 1-2 | 1-3 | 1-4 | 1-5 | 1-6 | 1-7 | 1-8 |
|---|---|---|---|---|---|---|---|---|
| $SiO_2$ | 50.00 | 49.87 | 48.00 | 50.00 | 50.00 | 47.00 | 47.00 | 47.00 |
| $Al_2O_3$ | 17.50 | 17.70 | 17.50 | 19.00 | 19.00 | 15.00 | 17.50 | 20.00 |
| MgO | 20.50 | 21.03 | 22.50 | 16.00 | 19.00 | 26.00 | 23.50 | 21.00 |
| $Y_2O_3$ | 2.00 | 2.00 | 2.00 | 2.50 | 2.50 | 2.00 | 2.00 | 2.00 |
| $TiO_2$ | 10.00 | 9.40 | 10.00 | 9.50 | 9.50 | 10.00 | 10.00 | 10.00 |
| ZnO | | | | 3.00 | | | | |
| 1st thermal treatment temp. | 800° C. | 810° C. | 810° C. | 805° C. | 810° C. | 800° C. | 800° C. | 810° C. |
| 1st thermal treatment hour | 4 hours | 4 hours | 4 hours | 4 hours | 4 hours | 4 hours | 4 hours | 4 hours |
| Temp. increase rate | 5° C./min | 1° C./min | 1° C./min | 5° C./min | 5° C./min | 5° C./min | 5° C./min | 5° C./min |
| 2nd thermal treatment temp. | 1000° C. | 1000° C. | 1000° C. | 1000° C. | 1000° C. | 1000° C. | 1000° C. | 1000° C. |
| 2nd thermal treatment hour | 4 hours | 4 hours | 4 hours | 4 hours | 4 hours | 4 hours | 4 hours | 4 hours |
| Primary crystal phase | A, B, C, D | A, B, C, D | A, B, C, D | A, B, C, D | A, B, C, D | A, B, C, D | A, B, C, D | A, B, C, D |
| Secondary crystal phase | E, F | E, F | E, F | E, F | E, F | E, F | E, F | E, F |
| Young's modulus | 135.6 | 131.9 | 138.4 | 131.9 | 137.4 | 153.8 | 147.5 | 139.7 |
| Poisson's ratio | 0.232 | 0.246 | 0.247 | 0.227 | 0.258 | 0.243 | 0.244 | 0.239 |

Crystal species: A: $2MgO.2Al_2O_3.4SiO_2$ (quartz solid solution),
B: $MgO.2Al_2O_3.5SiO_2$ (quartz solid solution),
C: $2MgO.2Al_2O_3.5SiO_2$ (quartz solid solution),
D: enstatite, E forsterite,
F: Mg—Al—titanate

TABLE 2

Crystallized glass compositions and property of Examples

| Oxide | 1-9 | 1-10 | 1-11 | 1-12 | 1-13 | 1-14 | 1-15 | 1-16 |
|---|---|---|---|---|---|---|---|---|
| $SiO_2$ | 47.00 | 47.00 | 55.00 | 52.50 | 50.00 | 46.00 | 44.00 | 52.00 |
| $Al_2O_3$ | 17.50 | 17.50 | 14.44 | 15.53 | 16.63 | 18.38 | 19.25 | 12.50 |
| MgO | 21.50 | 19.50 | 18.56 | 19.97 | 21.37 | 23.62 | 24.75 | 23.50 |
| $Y_2O_3$ | 2.00 | 2.00 | 2.00 | 2.00 | 2.00 | 2.00 | 2.00 | 2.00 |
| $TiO_2$ | 12.00 | 14.00 | 10.00 | 10.00 | 10.00 | 10.00 | 10.00 | 10.00 |
| ZnO | | | | | | | | |
| 1st thermal treatment temp. | 800° C. | 795° C. | 800° C. | 803° C. | 805° C. | 805° C. | 805° C. | 790° C. |
| 1st thermal treatment hour | 4 hours | 4 hours | 4 hours | 4 hours | 4 hours | 4 hours | 4 hours | 4 hours |
| Temp. increase rate | 5° C./min | 5° C./min | 5° C./min | 5° C./min | 5° C./min | 5° C./min | 5° C./min | 5° C./min |
| 2nd thermal treatment temp. | 1000° C. | 1000° C. | 1000° C. | 1000° C. | 1000° C. | 1000° C. | 1000° C. | 1000° C. |
| 2nd thermal treatment hour | 4 hours | 4 hours | 4 hours | 4 hours | 4 hours | 4 hours | 4 hours | 4 hours |
| Primary crystal phase | A, B, C, D | A, B, C, D | A, B, C, D | A, B, C, D | A, B, C, D | A, B, C, D | A, B, C, D | A, B, C, D |
| Secondary crystal phase | E, F | E, F | E, F | E, F | E, F | E, F | E, F | E, F |

TABLE 2-continued

Crystallized glass compositions and property of Examples

| Oxide | 1-9 | 1-10 | 1-11 | 1-12 | 1-13 | 1-14 | 1-15 | 1-16 |
|---|---|---|---|---|---|---|---|---|
| Young's modulus | 140.1 | 132.9 | 123.2 | 131.5 | 133.7 | 143.7 | 154.1 | 134.7 |
| Poisson's ratio | 0.22 | 0.22 | 0.21 | 0.21 | 0.237 | 0.24 | 0.231 | 0.221 |

Crystal species: A: $2MgO \cdot 2Al_2O_3 \cdot 4SiO_2$ (quartz solid solution),
B: $MgO \cdot 2Al_2O_3 \cdot 5SiO_2$ (quartz solid solution),
C: $2MgO \cdot 2Al_2O_3 \cdot 5SiO_2$ (quartz solid solution),
D: enstatite, E forsterite,
F: Mg—Al—titanate

TABLE 3

Crystallized glass compositions and property of Examples

| Oxide | 2-1 | 2-2 | 2-3 | 2-4 | 2-5 | 2-6 | 2-7 | 2-8 | 2-9 |
|---|---|---|---|---|---|---|---|---|---|
| $SiO_2$ | 47.00 | 41.00 | 43.00 | 45.00 | 49.00 | 47.00 | 47.00 | 47.00 | 47.00 |
| $Al_2O_3$ | 12.50 | 12.50 | 12.50 | 12.50 | 12.50 | 12.50 | 12.50 | 12.50 | 12.50 |
| MgO | 28.50 | 34.50 | 32.50 | 30.50 | 26.50 | 27.50 | 30.50 | 26.50 | 26.50 |
| $Y_2O_3$ | 2.00 | 2.00 | 2.00 | 2.00 | 2.00 | 3.00 |  | 2.00 | 2.00 |
| $TiO_2$ | 10.00 | 10.00 | 10.00 | 10.00 | 10.00 | 10.00 | 10.00 | 9.50 | 9.50 |
| $La_2O_3$ |  |  |  |  |  |  |  |  |  |
| ZnO |  |  |  |  |  |  |  |  |  |
| BaO |  |  |  |  |  |  |  |  | 2.50 |
| SrO |  |  |  |  |  |  |  | 2.50 |  |
| NiO |  |  |  |  |  |  |  |  |  |
| $Al_2O_3$/MgO | 0.44 | 0.36 | 0.38 | 0.41 | 0.47 | 0.45 | 0.47 | 0.41 | 0.41 |
| 1st thermal treatment temp. | 800° C. | 790° C. | 790° C. | 790° C. | 790° C. | 790° C. | 780° C. | 792° C. | 792° C. |
| 1st thermal treatment hour | 4 hours | 4 hours | 4 hours | 4 hours | 4 hours | 4 hours | 4 hours | 4 hours | 4 hours |
| Temp. increase rate | 5° C./min | 5° C./min | 5° C./min | 5° C./min | 5° C./min | 5° C./min | 5° C./min | 5° C./min | 5° C./min |
| 2nd thermal treatment temp. | 1000° C. | 1000° C. | 1000° C. | 1000° C. | 1000° C. | 1000° C. | 1000° C. | 1000° C. | 1000° C. |
| 2nd thermal treatment hour | 4 hours | 4 hours | 4 hours | 4 hours | 4 hours | 4 hours | 4 hours | 4 hours | 4 hours |
| Primary crystal phase | A, B, C, D | A, B, C, D | A, B, C, D | A, B, C, D | A, B, C, D | A, B, C, D | A, B, C, D | A, B, C, D | A, B, C, D |
| Secondary crystal phase | E, F | E, F | E, F | E, F | E, F | E, F | E, F | E, F | E, F |
| Young's modulus | 157.3 | 179.1 | 170 | 163.4 | 149 | 152.4 | 149.8 | 145.0 | 142.6 |
| Poisson's ratio | 0.237 | 0.245 | 0.245 | 0.241 | 0.233 | 0.233 | 0.248 | 0.246 | 0.244 |

Crystal species: A: $2MgO \cdot 2Al_2O_3 \cdot 4SiO_2$ (quartz solid solution),
B: $MgO \cdot 2Al_2O_3 \cdot 5SiO_2$ (quartz solid solution),
C: $2MgO \cdot 2Al_2O_3 \cdot 5SiO_2$ (quartz solid solution),
D: enstatite, E forsterite,
F: Mg—Al—titanate

TABLE 4

Crystallized glass compositions and property of Examples

| Oxide | 2-10 | 2-11 | 2-12 | 2-13 | 2-14 | 2-15 | 2-16 | 2-17 | 2-18 |
|---|---|---|---|---|---|---|---|---|---|
| $SiO_2$ | 47.00 | 47.00 | 47.00 | 47.00 | 47.00 | 47.00 | 47.00 | 39.00 | 39.00 |
| $Al_2O_3$ | 12.50 | 12.50 | 12.50 | 12.50 | 12.50 | 12.50 | 12.50 | 12.50 | 12.50 |
| MgO | 26.50 | 26.50 | 26.50 | 28.50 | 28.50 | 28.50 | 28.50 | 36.50 | 38.50 |
| $Y_2O_3$ | 2.00 | 2.00 |  |  |  |  |  | 2.00 | 2.00 |
| $TiO_2$ | 9.50 | 9.50 | 10.00 | 10.00 | 10.00 | 10.00 | 10.00 | 10.00 | 10.00 |
| $La_2O_3$ |  |  | 2.00 |  |  |  |  |  |  |

TABLE 4-continued

Crystallized glass compositions and property of Examples

| Oxide | 2-10 | 2-11 | 2-12 | 2-13 | 2-14 | 2-15 | 2-16 | 2-17 | 2-18 |
|---|---|---|---|---|---|---|---|---|---|
| ZnO | 2.50 | | | | | | | | |
| BaO | | | | | | | | | |
| SrO | | | | | | | | | |
| NiO | | 2.50 | | | | | | | |
| CeO$_2$ | | | | | 2.00 | | | | |
| Nb$_2$O$_3$ | | | | | | 2.00 | | | |
| Ta$_2$O$_5$ | | | | | | | 2.00 | | |
| ZrO$_2$ | | | | | | | | 2.00 | |
| Al$_2$O$_3$/MgO | 0.41 | 0.41 | 0.41 | 0.44 | 0.44 | 0.44 | 0.44 | 0.34 | 0.34 |
| 1st thermal treatment temp. | 780° C. | 785° C. | 780° C. | 774° C. | 760° C. | 795° C. | 780° C. | 790° C. | 785° C. |
| 1st thermal treatment hour | 4 hours | 4 hours | 4 hours | 4 hours | 4 hours | 4 hours | 4 hours | 4 hours | 4 hours |
| Temp. increase rate | 5° C./min | 5° C./min | 5° C./min | 5° C./min | 5° C./min | 5° C./min | 5° C./min | 5° C./min | 5° C./min |
| 2nd thermal treatment temp. | 1000° C. | 1000° C. | 1000° C. | 1000° C. | 1000° C. | 1000° C. | 1000° C. | 970° C. | 1000° C. |
| 2nd thermal treatment hour | 4 hours | 4 hours | 4 hours | 4 hours | 4 hours | 4 hours | 4 hours | 4 hours | 4 hours |
| Primary crystal phase | A, B, C, D | A, B, C, D | A, B, C, D | A, B, C, D | A, B, C, D | A, B, C, D | A, B, C, D | A, B, C, D | A, B, C, D |
| Secondary crystal phase | E, F | E, F | E, F | E, F | E, F | E, F | E, F | E, F | E, F |
| Young's modulus | 155.5 | 153.3 | 156.1 | 151.5 | 152 | 132.9 | 147.8 | 187.9 | 198 |
| Poisson's ratio | 0.235 | 0.23 | 0.23 | 0.233 | 0.223 | 0.221 | 0.227 | 0.24 | 0.242 |

Crystal species: A: 2MgO.2Al$_2$O$_3$.4SiO$_2$ (quartz solid solution),
B: MgO.2Al$_2$O$_3$.5SiO$_2$ (quartz solid solution),
C: 2MgO.2Al$_2$O$_3$.5SiO$_2$ (quartz solid solution),
D: enstatite, E forsterite,
F: Mg—Al—titanate

TABLE 5

Crystallized glass compositions and property of Examples

| Oxide | 3-1 | 3-2 | 3-3 | 3-4 | 3-5 | 3-6 | 3-7 | 3-8 | 3-9 | 3-10 |
|---|---|---|---|---|---|---|---|---|---|---|
| SiO$_2$ | 48.50 | 48.50 | 48.00 | 48.00 | 48.00 | 48.00 | 48.00 | 47.00 | 47.00 | 50.00 |
| Al$_2$O$_3$ | 17.50 | 17.50 | 17.50 | 17.50 | 17.50 | 17.50 | 15.00 | 12.50 | 15.00 | 15.00 |
| MgO | 20.00 | 17.50 | 21.50 | 20.50 | 22.50 | 20.00 | 20.50 | 26.50 | 24.00 | 21.00 |
| Y$_2$O$_3$ | 2.00 | 2.00 | 2.00 | 2.00 | | 2.00 | 2.00 | 2.00 | 2.00 | 2.00 |
| TiO$_2$ | 9.50 | 9.50 | 8.50 | 9.50 | 9.50 | 7.50 | 9.50 | 9.50 | 9.50 | 9.50 |
| La$_2$O$_3$ | 2.50 | 5.00 | 2.50 | 2.50 | 2.50 | 5.00 | 5.00 | 2.50 | 2.50 | 2.50 |
| 1st thermal treatment temp. | 770° C. | 750° C. | 765° C. | 765° C. | 765° C. | 735° C. | 735° C. | 750° C. | 755° C. | 750° C. |
| 1st thermal treatment hour | 4 hours | 4 hours | 4 hours | 4 hours | 4 hours | 4 hours | 4 hours | 4 hours | 4 hours | 4 hours |
| Temp. increase rate | 5° C./min | 5° C./min | 5° C./min | 5° C./min | 5° C./min | 5° C./min | 5° C./min | 5° C./min | 5° C./min | 5° C./min |
| 2nd thermal treatment temp. | 950° C. | 950° C. | 950° C. | 950° C. | 950° C. | 950° C. | 950° C. | 950° C. | 950° C. | 950° C. |
| 2nd thermal treatment hour | 4 hours | 4 hours | 4 hours | 4 hours | 4 hours | 4 hours | 4 hours | 4 hours | 4 hours | 4 hours |
| Primary crystal phase | A, B, C, D | A, B, C, D | A, B, C, D | A, B, C, D | A, B, C, D | A, B, C, D | A, B, C, D | A, B, C, D | A, B, C, D | A, B, C, D |

TABLE 5-continued

Crystallized glass compositions and property of Examples

| Oxide | 3-1 | 3-2 | 3-3 | 3-4 | 3-5 | 3-6 | 3-7 | 3-8 | 3-9 | 3-10 |
|---|---|---|---|---|---|---|---|---|---|---|
| Secondary crystal phase | E, F | E, F | E, F | E, F | E, F | E, F | E, F | E, F | E, F | E, F |
| Young's modulus | 138.9 | 132.6 | 141.1 | 139.9 | 137.6 | 135.9 | 135.2 | 149.4 | 145.4 | 139.4 |
| Poisson's ratio | 0.24 | 0.246 | 0.244 | 0.243 | 0.243 | 0.246 | 0.248 | 0.245 | 0.245 | 0.244 |

Crystal species: A: $2MgO \cdot 2Al_2O_3 \cdot 4SiO_2$ (quartz solid solution),
B: $MgO \cdot 2Al_2O_3 \cdot 5SiO_2$ (quartz solid solution),
C: $2MgO \cdot 2Al_2O_3 \cdot 5SiO_2$ (quartz solid solution),
D: enstatite, E forsterite,
F: Mg—Al—titanate

TABLE 6

Crystallized glass compositions and property of Examples

| Oxide | 3-11 | 3-12 | 3-13 | 3-14 | 3-15 | 3-16 | 3-17 | 3-18 | 3-19 |
|---|---|---|---|---|---|---|---|---|---|
| $SiO_2$ | 50.00 | 47.00 | 41.00 | 43.00 | 45.00 | 47.00 | 43.00 | 41.00 | 45.00 |
| $Al_2O_3$ | 15.00 | 12.50 | 12.50 | 12.50 | 12.50 | 12.50 | 12.50 | 12.50 | 12.50 |
| MgO | 21.00 | 27.50 | 36.50 | 32.50 | 30.50 | 28.50 | 32.50 | 34.50 | 30.50 |
| $Y_2O_3$ | 2.00 | 2.00 | 2.00 | 2.00 | 2.00 | 2.00 | 2.00 | 2.00 | 2.00 |
| $TiO_2$ | 9.50 | 9.50 | 10.00 | 10.00 | 10.00 | 10.00 | 9.00 | 9.00 | 9.00 |
| $La_2O_3$ | 2.50 | 2.50 | 2.00 | 2.00 | 2.00 | 2.00 | 1.00 | 1.00 | 1.00 |
| 1st thermal treatment temp. | 755° C. | 750° C. | 750° C. | 750° C. | 750° C. | 750° C. | 765° C. | 765° C. | 770° C. |
| 1st thermal treatment hour | 4 hours | 4 hours | 4 hours | 4 hours | 4 hours | 4 hours | 4 hours | 4 hours | 4 hours |
| Temp. increase rate | 5° C./min | 5° C./min | 5° C./min | 5° C./min | 5° C./min | 5° C./min | 5° C./min | 5° C./min | 5° C./min |
| 2nd thermal treatment temp. | 950° C. | 950° C. | 950° C. | 950° C. | 950° C. | 950° C. | 950° C. | 950° C. | 950° C. |
| 2nd thermal treatment hour | 4 hours | 4 hours | 4 hours | 4 hours | 4 hours | 4 hours | 4 hours | 4 hours | 4 hours |
| Primary crystal phase | A, B, C, D | A, B, C, D | A, B, C, D | A, B, C, D | A, B, C, D | A, B, C, D | A, B, C, D | A, B, C, D | A, B, C, D |
| Secondary crystal phase | E, F | E, F | E, F | E, F | E, F | E, F | E, F | E, F | E, F |
| Young's modulus | 135.7 | 149.5 | 170.1 | 163.2 | 156.8 | 150.4 | 169.4 | 180 | 160.7 |
| Poisson's ratio | 0.245 | 0.245 | 0.248 | 0.246 | 0.244 | 0.243 | 0.248 | 0.241 | 0.248 |

Crystal species: A: $2MgO \cdot 2Al_2O_3 \cdot 4SiO_2$ (quartz solid solution),
B: $MgO \cdot 2Al_2O_3 \cdot 5SiO_2$ (quartz solid solution),
C: $2MgO \cdot 2Al_2O_3 \cdot 5SiO_2$ (quartz solid solution),
D: enstatite, E forsterite,
F: Mg—Al—titanate

TABLE 7

Comparative Examples

| Oxide | 1<br>Chemically reinforced glass | 2<br>Commercially available TS-10 crystallized glass |
|---|---|---|
| | Japanese Unexamined Patent Publication No. 1–239036 | U.S. Pat. No. 2,516,553 |
| $SiO_2$ | 73.0 | |
| $Al_2O_3$ | 0.6 | |
| CaO | 7.0 | |
| $Na_2O$ | 9.0 | |

TABLE 7-continued

| | Comparative Examples | |
|---|---|---|
| | 1<br>Chemically reinforced glass | 2<br>Commercially available TS-10 crystallized glass |
| $K_2O$ | 9.0 | |
| ZnO | 2.0 | |
| $As_2O_3$ | 0.2 | |
| Young's modulus (GPa) | 79 | 90–100 |
| Surface roughness Ra (nm) | 12 | 10–35 |

As apparent from the consequences in Tables 1, 2, the crystallized glass of the invention in Examples 1—1 to 1-16 has higher strength characteristics such as the Young's modulus (120 GPa or more) and specific modulus of elasticity (in a range of 40–60 MNm/kg). Therefore, if those glasses are used as a substrate for information recording medium such as magnetic recording medium, the substrate is hardly subject to warps or deviations even where spun at a high speed and also can correspond to further thinner substrates. The surface roughness (Ra) of the crystallized glass can be polished to 5 angstroms or less by an ordinary optical glass polishing method using abrasives such as synthetic diamonds, silicon carbides, calcium oxides, iron oxides, and cerium oxides. Therefore, the substrate can be obtained with excellent flatness, and the substrate can be useful as a glass substrate for magnetic recording medium for aiming low flying of the magnetic head.

Figure 2:
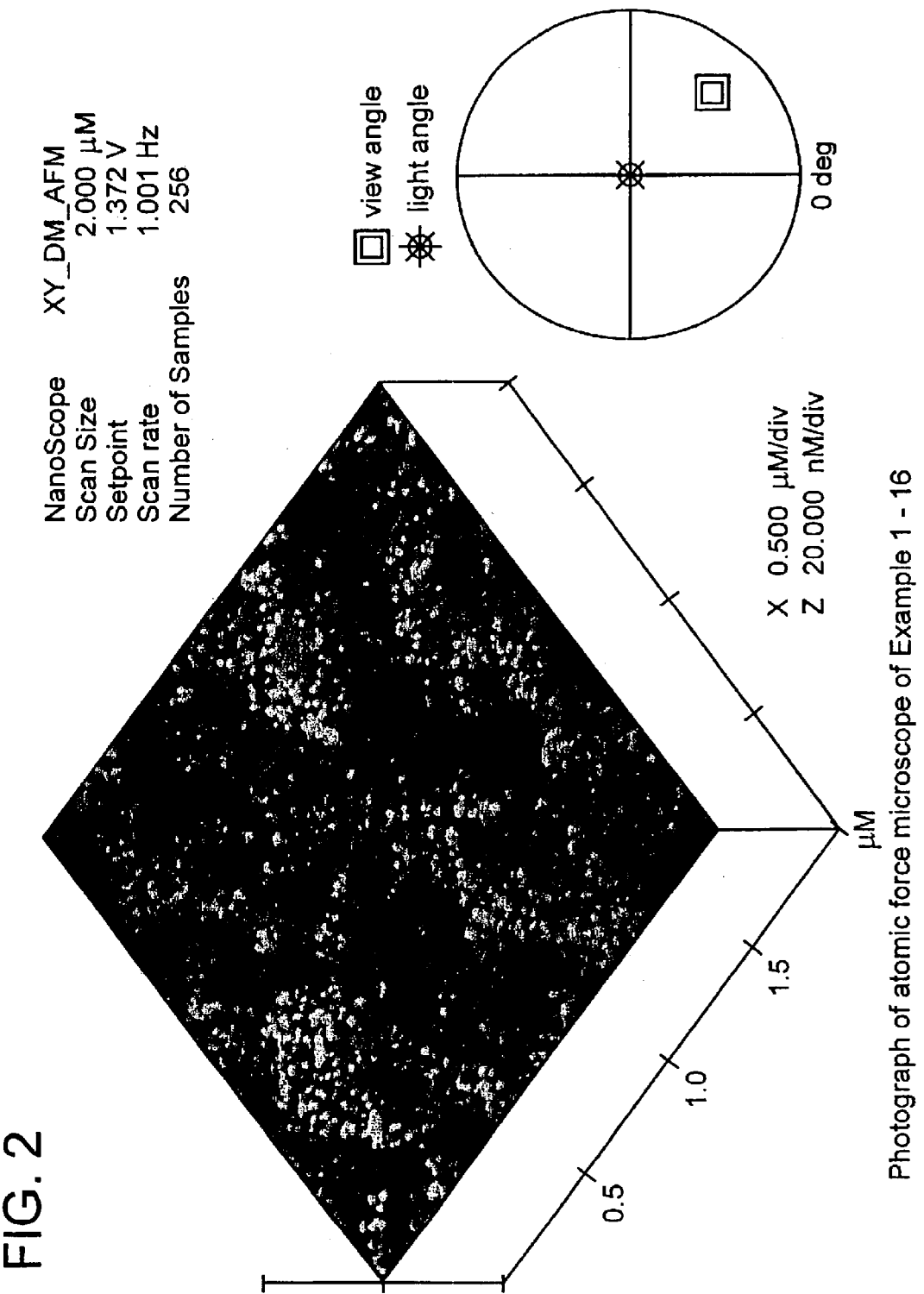
FIG. 2 is a photograph of an atomic force microscope showing a crystallized glass obtained in Example 1-16.

FIGS. 1, 2 show photographs of an atomic force microscope showing the crystallized glass obtained in Example 1-16. As shown in pictures, the surface smoothness of the crystallized glass of Example 1-16 can be polished to 4 angstroms or less by a polishing method for ordinary optical glass using cerium oxides. Where the liquid temperature of Example 1-16 was measured, it was 1320° C., and it indicated easiness for molding.

As apparent from the consequences in Tables 3, 4, the crystallized glass of the invention in Examples 2-1 to 2-18 has higher strength characteristics such as the Young's modulus (140 GPa or more) and specific modulus of elasticity (in a range of 40–60 MNm/kg). Therefore, if those glasses are used as a substrate for information recording medium such as magnetic recording medium, the substrate is hardly subject to warps or deviations even where spun at a high speed and also can correspond to further thinner substrates. The surface roughness (Ra) of the crystallized glass can be polished to 5 angstroms or less by an ordinary optical glass polishing method using abrasives such as synthetic diamonds, silicon carbides, calcium oxides, iron oxides, and cerium oxides. Therefore, the substrate can be obtained with excellent flatness, and the substrate can be useful as a glass substrate for magnetic recording medium for aiming low flying of the magnetic head.

Figure 3:
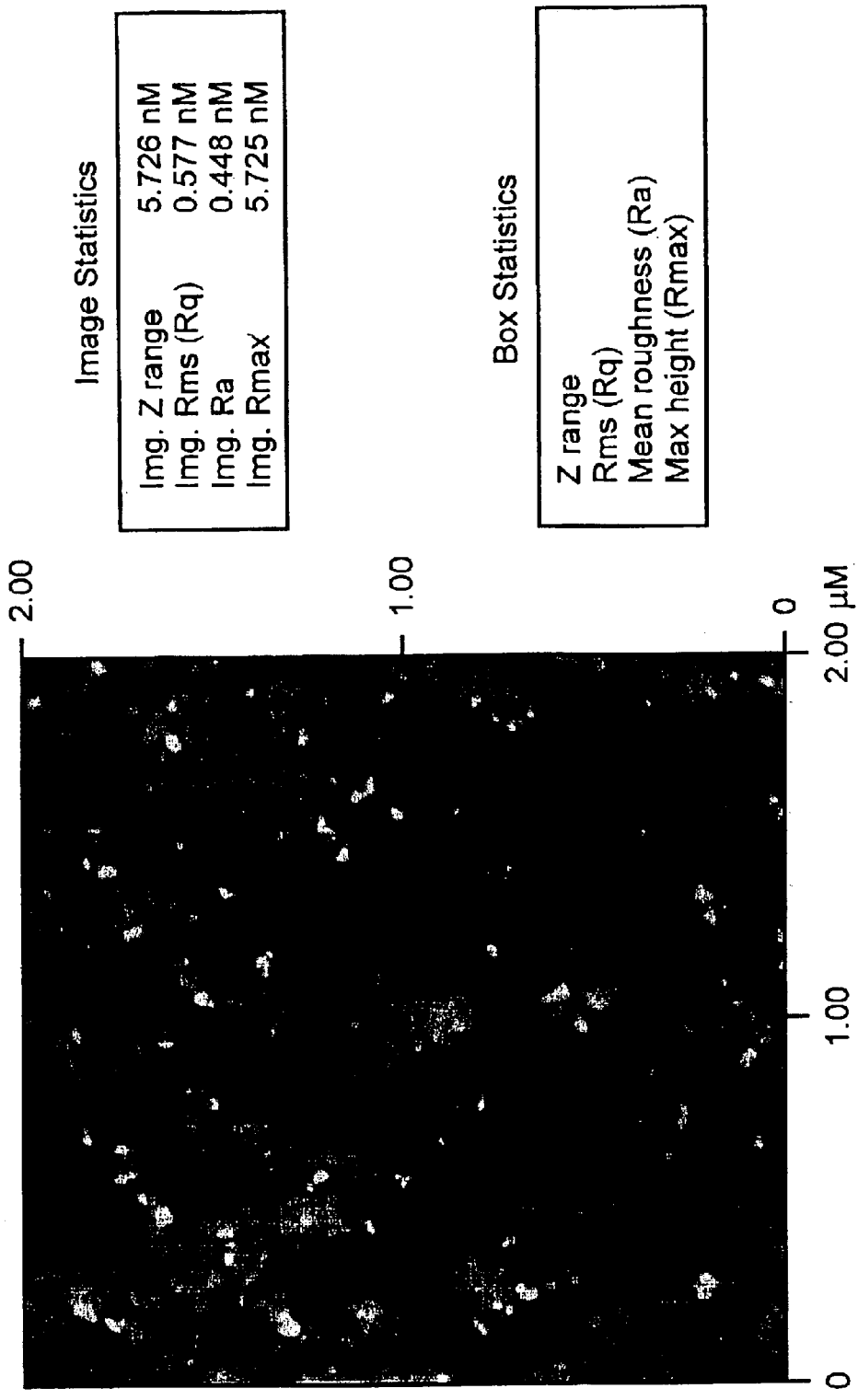
FIG. 3 is a photograph of an atomic force microscope showing a crystallized glass obtained in Example 2-5.
Figure 4:
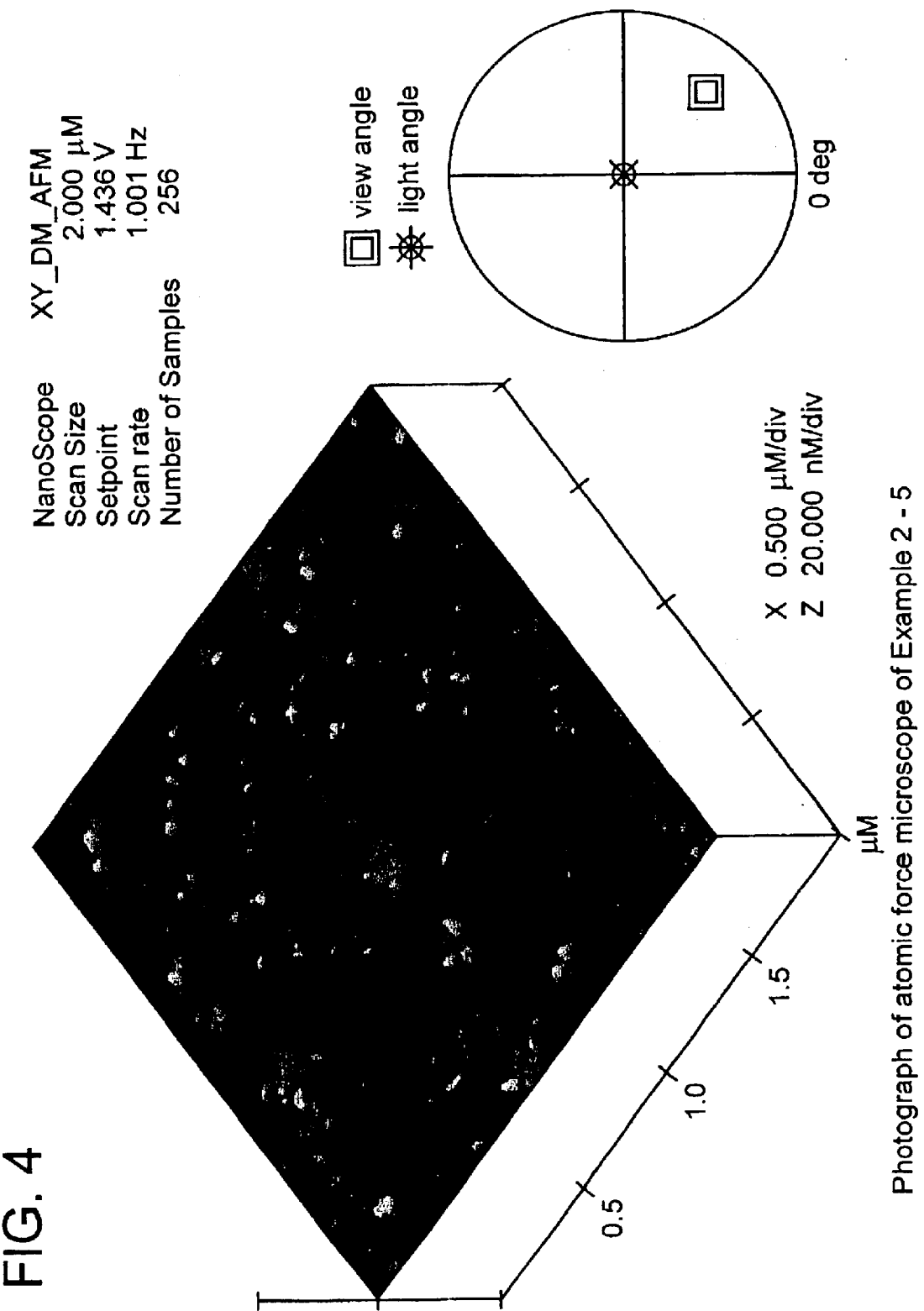
FIG. 4 is a photograph of an atomic force microscope showing a crystallized glass obtained in Example 2-5.

FIGS. 3, 4 show photographs of an atomic force microscope showing the crystallized glass obtained in Example 2-5. As shown in pictures, the surface smoothness of the crystallized glass of Example 1-16 can be polished to 4.5 angstroms or less by a polishing method for ordinary optical glass using cerium oxides. Where the liquid temperature of Example 2-1 was measured, it was 1292° C., and it indicated easiness for molding.

As apparent from the consequences in Tables 5, 6, the crystallized glass of the invention in Examples 3-1 to 3-19 has higher strength characteristics such as the Young's modulus (130 GPa or more) and specific modulus of elasticity (in a range of 40–60 MNm/kg). Therefore, if those glasses are used as a substrate for magnetic recording medium, the substrate is hardly subject to warps or deviations even where spun at a high speed and also can correspond to further thinner substrates. The surface roughness (Ra) of the crystallized glass can be polished to 5 angstroms or less by an ordinary optical glass polishing method using abrasives such as synthetic diamonds, silicon carbides, calcium oxides, iron oxides, and cerium oxides. Therefore, the substrate can be obtained with excellent flatness, and the substrate can be useful as a glass substrate for magnetic recording medium for aiming low flying of the magnetic head.

Moreover, where the liquid temperature of Example 3-13 was measured, it was 1280° C., and it indicated adequate easiness for molding.

Figure 5:
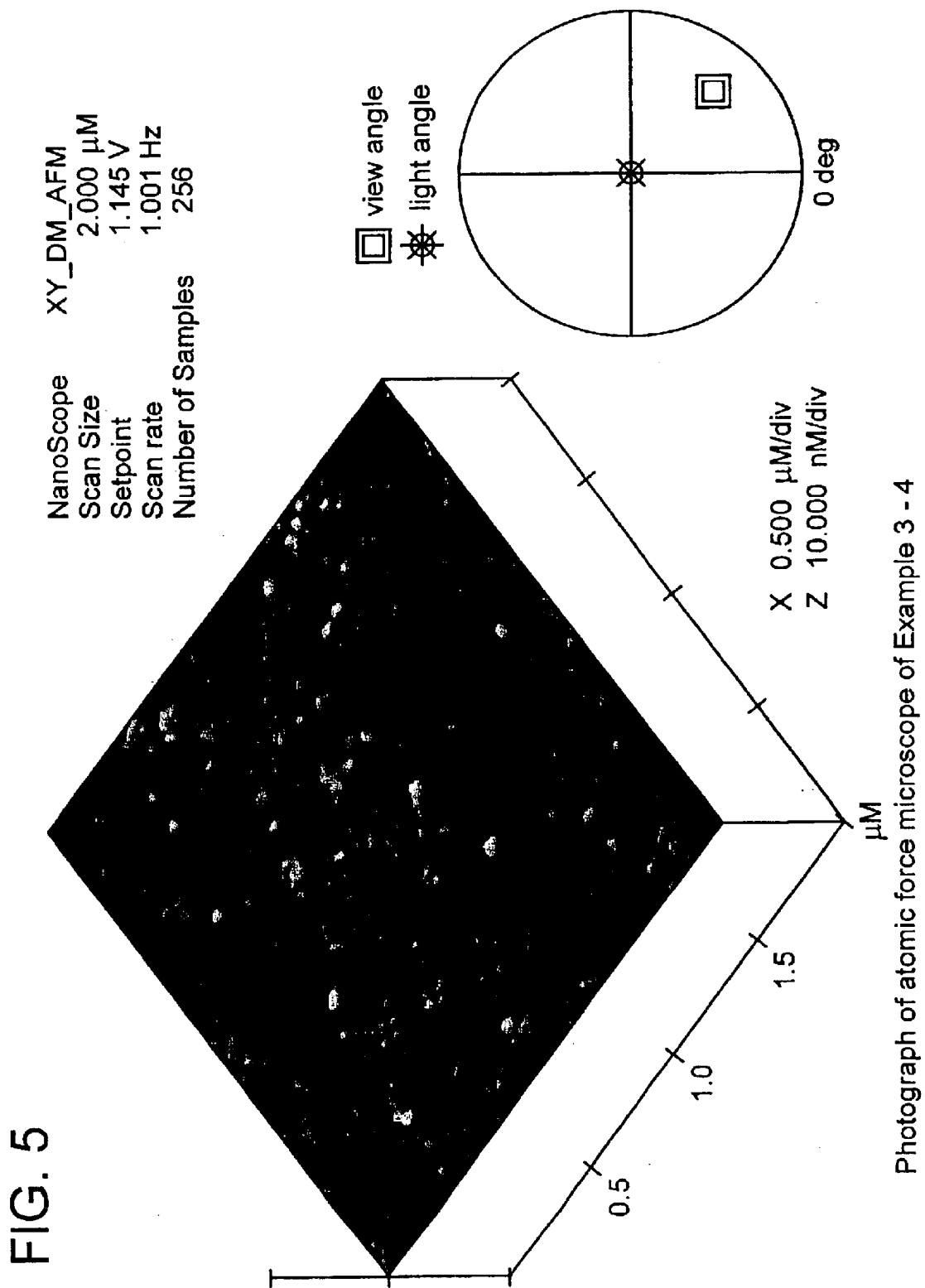
FIG. 5 is a photograph of an atomic force microscope showing a crystallized glass obtained in Example 3-4.
Figure 6:
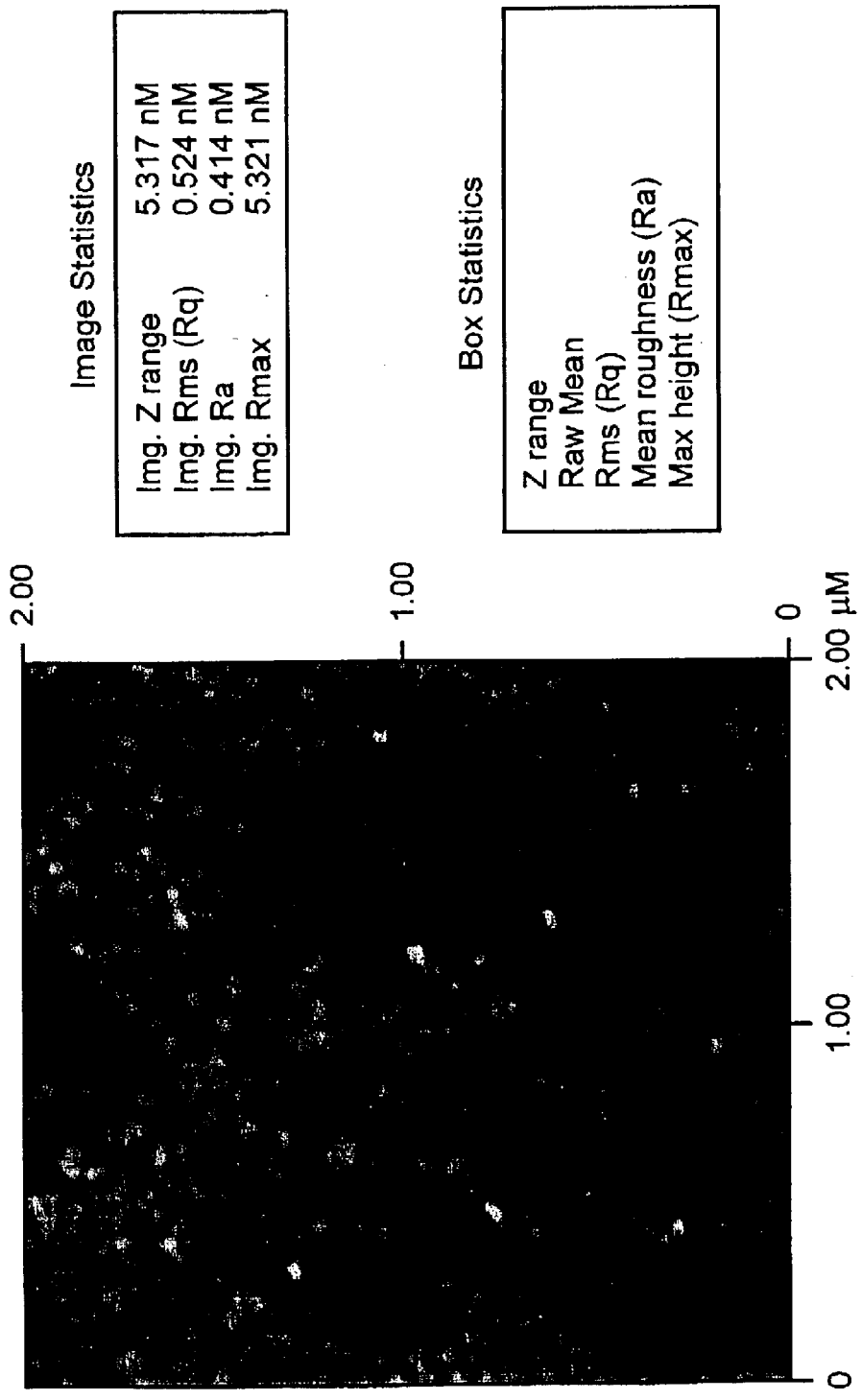
FIG. 6 is a photograph of an atomic force microscope showing a crystallized glass obtained in Example 3-4.

The surface roughness was measured by surface observations in use of an atomic force microscope (AFM). The arithmetic mean roughness was calculated in an area of 2×2 micron for 3 to 5 spots on each sample surface. Although the surface roughness is different depending on polishing conditions and thermal treatment conditions as a matter of course, FIGS. 5, 6 show AFM photographs after the crystallized glass of Example 3-4 thermally treated under the thermal condition shown in Table 5 was polished by a polishing process for optical glass. As shown in FIG. 6, it turned out that the crystal grain of the invented crystallized glass is further smaller than one micron. The surface roughness of Example 3-1 is about 4 angstroms, small, so that the glass can adequately correspond to demands for surface smoothness for magnetic disc of the next generation. A crystallized glass can be produced with more excellent surface smoothness if the thermal treatment condition and polishing condition are made most appropriate.

To the contrary, the chemically reinforced glass substrate of Comparative Example 1 has excellent surface smoothness and flatness, but it has limited strength characteristics such as heat resistance and Young's modulus, which is inferior in comparison with the crystallized glass of the invention. Accordingly, where a magnetic recording medium is manufactured, a thermal treatment may not be done adequately to the magnetic layer for obtaining a high coercive force, so that magnetic recording medium cannot be obtained with a high coercive force. The glass of Comparative Example 1 may sustain corrosions occurring between the substrate and the magnetic film because the glass contains alkali in a large amount, and the magnetic film may be damaged.

The crystallized glass substrate of Comparative Example 2 is inferior to the glass of the invention in terms of Young's modulus, specific modulus of elasticity, and smoothness. Particularly, since the smoothness of the substrate is deteriorated by existence of large crystal grains, it is difficult to render a high density recording.

EXAMPLES 4-1 to 4-8

Glass compositions of Examples 4-1 to 4-8 are shown in Table 8 by mol %. As a starting raw material for melting such a glass, $SiO_2$, $Al_2O_3$, $Al(OH)_3$, MgO, $CaCO_3$, $Y_2O_3$, $TiO_2$, $ZrO_2$, $Li_2CO_3$, and the like were used in a prescribed blend shown in Table 1 where measured to be 250 to 300 g to form a ready-mixed batch upon adequate mixing, and then, the materials were introduced in a platinum crucible to melt the glass for four to five hours in open air in stirring at 1550° C. After melting, the glass liquid was casted into a carbon made mold in a size of 180×15×25 mm and was subsequently placed in an anneal furnace right after the glass liquid was slowly cooled to the glass transition temperature, and it was further cooled to room temperature in the furnace upon one hour annealing in a temperature span of the glass transition point. The obtained glass did not show any deposited crystal observable by means of a microscope.

The glass in the size of 180×15×25 mm was placed in a thermal furnace after polished to sizes of 100×10×10 mm, 10×10×20 mm, and 10×1×20 mm. The glass was heated to a first thermal treatment temperature (nucleus formation temperature) shown in Table 1 at a temperature increase rate of 3 to 10° C. per minute, and was subject to the first thermal treatment while kept at the temperature for two to fifteen hours. The glass was then heated to a second thermal treatment temperature (crystallization temperature) shown in Table 1 at a temperature increase rate of 1 to 20° C. per minute from the first thermal treatment temperature right after the first thermal treatment ends, and was kept at the temperature for one to eight hours, and a crystallized glass was produced by cooling the glass to room temperature in the furnace.

The obtained crystallized glass was polished to have a length of 95 mm as a sample for measurements of Young's modulus and specific gravity. The sample used for the Young's modulus measurement was further cut and precisely polished in a size of 25 mm×2 mm×15 mm for a sample for measuring surface roughness. The Young's modulus was measured by an ultrasound method using a 95×10×10 mm sample. Data measured thus are shown in Table 8 together with the glass compositions.

TABLE 8

Crystallized glass compositions and property of Examples

| Glass component (mol %) | 4-1 | 4-2 | 4-3 | 4-4 | 4-5 | 4-6 | 4-7 | 4-8 |
|---|---|---|---|---|---|---|---|---|
| $SiO_2$ | 56.00 | 58.00 | 56.00 | 58.00 | 55.00 | 55.00 | 55.00 | 50.00 |
| $Al_2O_3$ | 5.00 | 2.50 | 2.50 | 4.50 | 4.00 | 4.00 | 5.00 | 5.00 |
| MgO | 15.00 | 14.00 | 15.00 | 14.00 | 15.00 | 12.00 | 15.00 | 20.00 |
| $Y_2O_3$ | 1.00 | 1.00 | 1.00 | 1.00 | 1.00 | 0.50 | 1.00 | 2.00 |
| $TiO_2$ | 8.50 | 8.50 | 8.50 | 8.50 | 8.50 | 8.50 | 5.00 | 8.50 |
| $ZrO_2$ | 2.00 | 2.00 | 2.00 |  | 2.00 | 2.00 | 2.00 | 2.00 |
| $Li_2O$ | 12.50 | 14.00 | 15.00 | 14.00 | 15.00 | 18.00 | 15.00 | 12.50 |
| $K_2O$ |  |  |  |  |  |  | 1.00 |  |
| $P_2O$ |  |  |  |  |  |  | 1.00 |  |
| Nucleus formation temperature (° C.) | 635 | 620 | 625 | 620 | 670 | 610 | 650 | 750 |
| Nucleus formation time (hr) | 4 | 4 | 4 | 4 | 4 | 4 | 4 | 4 |
| Crystallization temperature (° C.) | 800 | 750 | 730 | 800 | 800 | 800 | 800 | 950 |
| Crystallization time (hr) | 4 | 4 | 4 | 4 | 4 | 4 | 4 | 4 |
| Liquid phase temperature (° C.) | 1150 | 1110 | 1150 | 1150 | 1150 | 1150 | 1150 | 1150 |
| Surface roughness Ra (nm) | 0.3 | 0.4 | 0.3 | 0.3 | 0.3 | 0.3 | 0.4 | 0.3 |
| Young's modulus (Gpa) | 121 | 130 | 133 | 117 | 125.2 | 123.4 | 131 | 145 |

The surface roughness was measured by surface observations in use of an atomic force microscope (AFM). The arithmetic mean roughness was calculated in an area of 5×5 micron for 3 to 5 spots on each sample surface. Although the surface roughness is different depending on polishing conditions and thermal treatment conditions as a matter of course, FIG. 7 shows AFM photographs after the crystallized glass of Example 4 thermally treated under the thermal condition shown in Table 1 was polished by a polishing process for optical glass. The surface roughness of Example 4 is about 0.3 nm, small, so that the glass can adequately correspond to demands for surface smoothness for magnetic disc of the next generation. A crystallized glass can be produced with more excellent surface smoothness if the thermal treatment condition and polishing condition are made most appropriate.

As apparent from Table 8, the glass substrate of the invention (Examples 4-1 to 4-8) has a higher Young's modulus (in a range of 115 to 150 GPa). Therefore, if those glasses are used as a substrate for magnetic recording medium, the substrate is hardly subject to warps or deviations even where spun at a high speed and also can correspond to further thinner substrates. The surface roughness (Ra) of the crystallized glass can be polished to 5 angstroms (0.5 nm) or less, and therefore, the substrate can be obtained with excellent flatness and can be useful as a glass substrate for magnetic recording medium in aiming low flying of the magnetic head.

Examples 5–1 to 5-6

Glass compositions of Examples 5-1 to 5-6 are shown in Table 9 by mol %. As a starting raw material for melting such a glass, $SiO_2$, $Al_2O_3$, $Al(OH)_3$, MgO, $CaCO_3$, $Y_2O_3$, $TiO_2$, $ZrO_2$, $Li_2CO_3$, and the like were used in a prescribed blend shown in Table 1 where measured to be 250 to 300 g to form a ready-mixed batch upon adequate mixing, and then, the materials were introduced in a platinum crucible to melt the glass for four to five hours in open air in stirring at 1550° C. After melting, the glass liquid was casted into a carbon made mold in a size of 180×15×25 mm and was subsequently placed in an anneal furnace right after the glass liquid was slowly cooled to the glass transition temperature, and it was further cooled to room temperature in the furnace upon one hour annealing in a temperature span of the glass transition point. The obtained glass did not show any deposited crystal observable by means of a microscope.

The glass in the size of 180×15×25 mm was placed in a thermal furnace after polished to sizes of 100×10×10 mm, 10×10×20 mm, and 10×1×20 mm. The glass was heated to a first thermal treatment temperature (nucleus formation temperature) shown in Table 1 at a temperature increase rate of 3 to 10° C. per minute, and was subject to the first thermal treatment while kept at the temperature for two to fifteen hours. The glass was then heated to a second thermal treatment temperature (crystallization temperature) shown in Table 1 at a temperature increase rate of 3 to 10° C. per minute from the first thermal treatment temperature right after the first thermal treatment ends, and was kept at the temperature for one to five hours, and a crystallized glass was produced by cooling the glass to room temperature in the furnace.

The obtained crystallized glass was polished to have a length of 95 mm as a sample for measurements of Young's modulus and specific gravity. The sample used for the Young's modulus measurement was further cut and precisely polished in a size of 25 mm×2 mm×15 mm for a sample for measuring surface roughness. The Young's modulus was measured by an ultrasound method using a 95×10×10 mm sample. Data measured thus are shown in Table 9 together with the glass compositions.

TABLE 9

Crystallized glass compositions and property of Examples

| Glass component (mol %) | 5-1 | 5-2 | 5-3 | 5-4 | 5-5 | 5-6 |
|---|---|---|---|---|---|---|
| $SiO_2$ | 52.00 | 48.00 | 52.00 | 48.00 | 47.00 | 42.00 |
| $Al_2O_3$ | 4.00 | 4.00 | 2.00 | 4.00 | | |
| MgO | 34.80 | 34.80 | 36.50 | 42.00 | 42.00 | 40.00 |
| $Y_2O_3$ | 1.00 | 1.00 | 1.00 | 1.00 | 2.20 | 5.00 |
| $TiO_2$ | | 4.00 | | | 6.80 | 6.50 |
| $ZrO_2$ | 5.70 | 5.70 | 6.00 | 5.00 | | 3.50 |
| $Li_2O$ | 2.50 | 2.50 | 2.50 | | | |
| $Na_2O$ | | | | | 1.00 | 2.00 |
| $K_2O$ | | | | | 1.00 | 1.00 |
| Nucleus formation temperature (° C.) | 760 | 750 | 765 | 815 | 725 | 730 |
| Nucleus formation time (hr) | 4 | 4 | 4 | 4 | 8 | 8 |
| Crystallization temperature (° C.) | 1000 | 1000 | 1000 | 1000 | 950 | 950 |
| Crystallization time (hr) | 4 | 4 | 4 | 4 | 4 | 4 |
| Surface roughness Ra (nm) | 0.5 | 0.3 | 0.3 | 0.5 | 0.3 | 0.3 |
| Young's modulus (Gpa) | 145 | 150 | 145 | 150 | 162 | 185 |

The surface roughness was measured by surface observations in use of an atomic force microscope (AFM). The arithmetic mean roughness was calculated in an area of 5×5 micron for 3 to 5 spots on each sample surface. Although the surface roughness is different depending on polishing conditions and thermal treatment conditions as a matter of course, FIG. 8 shows AFM photographs after the crystallized glass of Example 5 thermally treated under the thermal condition shown in Table 1 was polished by a polishing process for optical glass. The surface roughness of Example 5 is about 0.5 nm, small, so that the glass can adequately correspond to demands for surface smoothness for magnetic disc of the next generation. A crystallized glass can be produced with more excellent surface smoothness if the thermal treatment condition and polishing condition are made most appropriate.

As apparent from Table 9, the glass substrate of Examples of the invention has a higher Young's modulus (in a range of 140 to 200 GPa). Therefore, if those glasses are used as a substrate for magnetic recording medium, the substrate is hardly subject to warps or deviations even where spun at a high speed and also can correspond to further thinner substrates. The surface roughness (Ra) of the crystallized glass can be polished to 0.5 nm or less, and therefore, the substrate can be obtained with excellent flatness and can be useful as a glass substrate for magnetic recording medium in aiming low flying of the magnetic head.

The crystallized glass according to First to Third Embodiments can be molded easily, has a high Young's modulus of 110 GPa or above, a high heat resistance of 900° C. or above, an excellent surface smoothness (surface roughness Ra is less than 20 angstroms), can be used as a substrate material for high rigidity and high strength and suitably as a material for electronic parts.

The substrate made of the crystallized glass according to First to Third Embodiments of the invention, since the material has an excellent heat resistance, can render a necessary thermal treatment for improving property of a magnetic film without deforming the substrate, can achieve low flying of a magnetic head, or namely, a high density recording because of the excellent flatness, and can make thinner magnetic discs and higher rotations because the glass has high Young's modulus, specific modulus of elasticity, and strength, as well as can advantageously avoid breakdown of a magnetic disc.

The crystallized glass according to First to Third Embodiments of the invention, since obtained in a relatively stable manner and can be produced easily with a business scale, can be expected greatly as an inexpensive substrate glass for magnetic recording medium for the next generation.

The crystallized glass according to Fourth and Fifth Embodiments of the invention, can be molded easily, has a high Young's modulus of 110 GPa or more and a high heat resistance against about 700° C., and has an excellent surface smoothness (surface roughness Ra is in a range of 0.1 to 0.9 nm). Therefore, the glass can provide a substrate material having a high rigidity and a high strength and materials for electronic parts. The magnetic disc using the crystallized glass according to Fourth and Fifth Embodiments of the invention can render a necessary thermal treatment for improving property of a magnetic film without deforming the substrate. Furthermore, the magnetic disc using the crystallized glass according to Fourth and Fifth Embodiments of the invention can achieve low flying of a magnetic head, or namely, a high density recording because of the excellent flatness, and can make thinner magnetic discs and higher rotations because the glass has high Young's modulus, specific modulus of elasticity, and strength, as well as can advantageously avoid breakdown of a magnetic disc.

The melting condition of the original glass has a temperature range of 1350 to 1450° C. for two to five hours to make the glass clarified and unified, so that the glass has good melting property and can be produced easily with a business scale, and so that the glass can be greatly expected as a substrate glass for inexpensive magnetic recording medium of the next generation.

The information recording medium according to the invention has a high Young's modulus, and uses a crystallized glass substrate having an excellent surface smoothness. Therefore, the medium can render vibrations less even during a high speed spin of the substrate, and particularly, it is suitable for hard disc drives of high performance such as for servers or the like.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined claims set forth below.

What is claimed is:

1. A crystallized glass substrate for information recording medium comprising $SiO_2$ of 35 to 65 mol %, $Al_2O_3$ of 5 to 25 mol %, MgO of 10 to 40 mol %, $TiO_2$ of 5 to 15 mol %, and $Li_2O$ of 0.2 to 10 mol %, wherein the substrate has a primary crystal phase comprising crystal grains of a quasi-stable quartz solid solution and an enstatite, and wherein the mean grain size of the crystal grains is 1 micron or less.

2. The substrate according to claim 1, wherein the quasi-stable quartz solid solution has one or more compositions selected from a group consisting of $2MgO.2Al_2O_3.5SiO_2$, $MgO.Al_2O_3.3SiO_2$, and $MgO.Al_2O_3.0.4SiO_2$.

3. The substrate according to claim 1, wherein the substrate comprises $Y_2O_3$ of 0 to 10 mol %.

4. The substrate according to claim 1, wherein the substrate comprises $Y_2O_3$ of 0.8 to 8 mol %.

5. The substrate according to claim 1, wherein a mole ratio ($Al_2O_3$/MgO) is less than 0.9.

6. The substrate according to claim 1, wherein a mole ratio ($Al_2O_3$/MgO) is less than 0.5.

7. The substrate according to claim 1, wherein the substrate further comprises $Na_2O$ of 0 to 10 mol %, $K_2O$ of 0 to 10 mol %, CaO of 0 to 10 mol %, SrO of 0 to 10 mol %, BaO of 0 to 10 mol %, ZnO of 0 to 10 mol %, NiO of 0 to 10 mol %, $R_2O_3$ of 0 to 5 mol % (wherein R is B ions or rare earth metal ions), $CeO_2$ of 0 to 5 mol %, $ZrO_2$ of 0 to 5 mol %, $N_2O_5$ of 0 to 5 mol % (wherein N is P ions, Nb ions, or Ta ions), $As_2O_3$ of 0 to 2 mol %, and $Sb_2O_3$ of 0 to 2 mol %.

8. An information recording medium comprising the substrate of claim 1 and a recording layer formed on the substrate.

9. The substrate according to claim 1, further comprising a content of ZnO in the substrate of 0–10 mol %.

* * * * *